United States Patent
Altonen et al.

(10) Patent No.: US 9,089,998 B2
(45) Date of Patent: Jul. 28, 2015

(54) INJECTION MOLD HAVING A SIMPLIFIED COOLING SYSTEM

(71) Applicant: The Procter & Gamble Company, Cincinnati, OH (US)

(72) Inventors: Gene Michael Altonen, West Chester, OH (US); Ralph Edwin Neufarth, Liberty Township, OH (US); John Boyet Stevens, Mason, OH (US); Robert Lawrence Prosise, Cincinnati, OH (US); James Edward Poland, Burlington, KY (US); John Moncrief Layman, Liberty Township, OH (US); Danny David Lumpkin, Cincinnati, OH (US)

(73) Assignee: iMFLUX, Inc., Cincinnati, OH (US)

( * ) Notice: Subject to any disclaimer, the term of this patent is extended or adjusted under 35 U.S.C. 154(b) by 0 days.

(21) Appl. No.: 14/176,398

(22) Filed: Feb. 10, 2014

(65) Prior Publication Data
US 2014/0154351 A1   Jun. 5, 2014

Related U.S. Application Data

(62) Division of application No. 13/774,571, filed on Feb. 22, 2013.

(60) Provisional application No. 61/602,781, filed on Feb. 24, 2012.

(51) Int. Cl.
| B29C 45/73 | (2006.01) |
|---|---|
| B29C 33/02 | (2006.01) |
| B29C 45/78 | (2006.01) |

(52) U.S. Cl.
CPC ............. *B29C 33/02* (2013.01); *B29C 45/7312* (2013.01); *B29C 45/73* (2013.01); *B29C 45/78* (2013.01)

(58) Field of Classification Search
CPC ................................. B29C 45/78; B29C 45/73
USPC ....................... 425/144, 547, 552; 264/328.16
See application file for complete search history.

(56) References Cited

U.S. PATENT DOCUMENTS

| 2,350,348 A | 6/1944 | Gaugler |
| 3,127,753 A | 4/1964 | Tinnerman |

(Continued)

FOREIGN PATENT DOCUMENTS

| DE | 2427969 A1 | 1/1976 |
| DE | 10256036 A1 | 6/2004 |

(Continued)

OTHER PUBLICATIONS

Barry James, "Evaporative Cooling Approach to Mold Temperature Control", article from MoldMaking Technology, posted on web Dec. 1, 2006, website http://www.moldmakingtechnology.com/articles/evaporative-cooling-approach-to-mold-temperature-control.

(Continued)

*Primary Examiner* — Tim Heitbrink
(74) *Attorney, Agent, or Firm* — Charles R. Ware

(57) ABSTRACT

An injection mold assembly for a high output consumer product injection molding machine, the injection mold assembly having a simplified cooling system. The simplified cooling system has a cooling complexity factor of less than three, preferably less than two, more preferably less than one.

19 Claims, 20 Drawing Sheets

(56) References Cited

U.S. PATENT DOCUMENTS

| | | | |
|---|---|---|---|
| 4,219,322 A | 8/1980 | Chang et al. | |
| 5,037,592 A | 8/1991 | Erienbach | |
| 5,350,288 A | 9/1994 | Kimoto et al. | |
| 5,407,342 A | 4/1995 | Boucher et al. | |
| 5,411,686 A | 5/1995 | Hata | |
| 5,419,858 A | 5/1995 | Hata et al. | |
| 5,423,670 A * | 6/1995 | Hamel | 425/144 |
| 5,478,520 A | 12/1995 | Kasai et al. | |
| 5,518,389 A | 5/1996 | Nonomura et al. | |
| 5,716,561 A | 2/1998 | Guergov | |
| 5,728,329 A | 3/1998 | Guergov | |
| 5,853,630 A | 12/1998 | Hettinga | |
| 5,902,525 A | 5/1999 | Hettinga | |
| 5,935,505 A | 8/1999 | Whetten et al. | |
| 6,090,318 A | 7/2000 | Bader et al. | |
| 6,276,656 B1 | 8/2001 | Baresich | |
| 6,290,882 B1 | 9/2001 | Maus et al. | |
| 6,372,162 B1 | 4/2002 | Szczech | |
| 6,464,909 B1 | 10/2002 | Kazmer et al. | |
| 6,616,871 B1 | 9/2003 | Iimura et al. | |
| 6,719,942 B1 | 4/2004 | Triplett et al. | |
| 6,824,379 B2 | 11/2004 | Doyle et al. | |
| 7,143,814 B1 | 12/2006 | James | |
| 7,419,625 B2 | 9/2008 | Vasapoli et al. | |
| 7,540,989 B2 * | 6/2009 | Kang | 264/328.16 |
| 7,621,739 B2 | 11/2009 | Tilton et al. | |
| 7,785,090 B2 | 8/2010 | Amano et al. | |
| 7,794,643 B2 | 9/2010 | Watanabe et al. | |
| 7,910,029 B2 | 3/2011 | Koumaro | |
| 8,235,694 B2 | 8/2012 | Nam | |
| 8,235,697 B2 | 8/2012 | Olin et al. | |
| 8,591,219 B1 | 11/2013 | Neufarth et al. | |
| 2001/0013672 A1 | 8/2001 | Kawamura et al. | |
| 2006/0165837 A1 | 7/2006 | Wood | |
| 2007/0108668 A1 | 5/2007 | Hutchinson et al. | |
| 2007/0184148 A1 | 8/2007 | Toyooka et al. | |
| 2008/0064805 A1 | 3/2008 | Uosaki et al. | |
| 2008/0143006 A1 | 6/2008 | Honma et al. | |
| 2008/0197537 A1 | 8/2008 | Stemke | |
| 2009/0020924 A1 | 1/2009 | Lin | |
| 2009/0174101 A1 | 7/2009 | Johnson | |
| 2011/0005729 A1 | 1/2011 | Stemke | |
| 2011/0232856 A1 | 9/2011 | James | |
| 2012/0035327 A1 | 2/2012 | Ciarafoni et al. | |
| 2012/0291885 A1 | 11/2012 | Altonen et al. | |
| 2012/0292823 A1 | 11/2012 | Altonen et al. | |
| 2012/0294963 A1 | 11/2012 | Altonen et al. | |
| 2012/0295049 A1 | 11/2012 | Altonen et al. | |
| 2012/0295050 A1 | 11/2012 | Altonen et al. | |
| 2012/0328724 A1 | 12/2012 | Altonen et al. | |
| 2012/0329948 A1 | 12/2012 | Altonen et al. | |
| 2013/0069280 A1 | 3/2013 | Altonen et al. | |
| 2013/0113131 A1 | 5/2013 | Altonen et al. | |
| 2013/0221572 A1 | 8/2013 | Berg, Jr. et al. | |
| 2013/0221575 A1 | 8/2013 | Altonen et al. | |
| 2013/0224327 A1 | 8/2013 | Altonen et al. | |
| 2013/0295219 A1 | 11/2013 | Neufarth et al. | |
| 2013/0295220 A1 | 11/2013 | Neufarth et al. | |

FOREIGN PATENT DOCUMENTS

| | | | |
|---|---|---|---|
| DE | 102009046835 A1 | 5/2011 | |
| GB | 2164895 A | 4/1986 | |
| JP | 60127125 | 7/1985 | |
| JP | 0222026 A | 3/1990 | |
| JP | 2098417 A | 4/1990 | |
| JP | 3079317 A | 4/1991 | |
| JP | 4126214 A | 4/1992 | |
| JP | 5006914 A | 1/1993 | |
| JP | 05077244 | 3/1993 | |
| JP | 7223242 A | 8/1995 | |
| JP | 11262936 | 9/1999 | |
| JP | 2000202863 A | 7/2000 | |
| JP | 2000280276 A | 10/2000 | |
| JP | 2003001378 A | 1/2003 | |
| JP | 2005215497 | 8/2005 | |
| WO | 2013126723 A1 | 8/2013 | |

OTHER PUBLICATIONS

Richard Abbott et al., "Elimination Process Constraints in Plastics Injection Molding", ThermoCeramiX Inc.,Shirley, Massachesetts, , Department of Plastics Engineering, University of Massachusetts Lowell, 8 pages.

BASF article from www.plasticsportal.com/usa, 6 pages.

Schnerr-Haeselbarth O:"Der Heisse Draht Ins Werkzeug Werkseuginnendruck-Basierte Systeme Steigern Die Produktivitat Und Senken Die Kosten", Kunstoffe International, Carl Hanser Verlag, Munchen DE, vol. 92, No. 7, Jul. 1, 2002, pp. 56-60.

Wikipedia: "Low Pressure Molding", pp. 1-4, XP002681936, Internet: http://en.wikipedia.org/wiki/Low_pressure_molding.

Homes W et al: "Spritzgiessprozesse in Echtzeit Regeln Eine Neue Technik Zur Aktiven Angussbalancierung", Kunstoffe International. Carl Hanser Verlag, Munchen DE, vol. 91, No. 1, Jan. 1, 2001, pp. 68-70.

Suh et al., "Structure Development of Various Polyolefins in Injection Molding", Antec 2006, Society of Plastics Engineers, 2006, pp. 760-765.

International Search Report, U.S. Appl. No. 13/476,045, dated Aug. 17, 2012, 14 pages.

International Search Report, U.S. Appl. No. 13/476,045, dated Aug. 16, 2012, 12 pages.

International Search Report, U.S. Appl. No. 13/476,073, dated Sep. 3, 2012, 16 pages.

International Search Report, U.S. Appl. No. 13/476,197, dated Aug. 16, 2012, 11 pages.

International Search Report, U.S. Appl. No. 13/476,178, dated Aug. 17, 2012, 13 pages.

International Search Report, U.S. Appl. No. 13/476,584, dated Aug. 17, 2012, 13 pages.

ALCOA:"QC-10 The aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.

"Specialized Aluminum Products for Tool and Mold Applications", May/Jun. 2003 issue of Aluminum Now journal of The Aluminum Association, Inc., 4 pages.

Ampco Metal, "Ampcoloy®944: A new copper—silicon—chromium alloy for the Moldmaking Industry", brochure, 2 pages, www.ampcometal.com.

Ampco Metal, "Ampcoloy®944", brochure, 2 pages, www.ampcometal.com.

Clinton Aluminum & Stainless Steel, "Why aluminum mold?" presentation, Oct. 30, 2006, 20 pages, toll free # 800-826-3370.

European Tool & Mould Making ETMM, "High strength, hardness, thermal conductivity characterize copper mould making alloy", online article Dec. 9, 2011, 2 pages, http://www.etmm-online.com/materials/articles/353445/.

Ampco Metal Inc., "Procurable Alloys", online article Nov. 2011, 5 pages, http://www.modernmetals.com/item/10715-procurable-alloys.html.

Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.

David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.

United States Patent and Trademark Office, online Trademark Electronic Search System, Moldmax HH, 2 pages, http://tess2.uspto.gov/bin/showfield?f=doc&state=4808:k8agoi.3.8.

Rhoda Miel, "Aluminating Tooling", PlasticsNews.com online article Apr. 27, 2009, 2 pages, http://www.plasticsnews.com/article/20090427/NEWS/304279985/aluminating-tooling.

(56) References Cited

OTHER PUBLICATIONS

Joseph Pryweller, "Aluminum Injection Mold", online article from PlasticsNews.com, Jan. 13, 2003, 2 pages, http://aluminuminjectionmold.com/articles.html.

David Bank et al., "Why Plastic Flows Better in Aluminum Injection Molds", plastics technology article Sep. 2008, 8 pages.

Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.

A L Kelly, et al, "The effect of copper alloy mold tooling on the performance of the injection molding process", online article from The Free Library, 10 pages, http://www.thefreelibrary.com/The+effect+of+copper+alloy+mold+tooling+on+the+performance.

United States Patent and Trademark Office, online Trademark Electronic Search System, QC 10, 2 pages, http://tess2.uspto.gov/bin/showfield?f=doc&state=4810:7di60m.2.1.

Thyssenkrupp Materials NA, "QC-10 Aluminum Mold Plate", brochure, 4 pages.

Uddeholm, "Moldmax HH", brochure, 8 pages, www.uddeholm.com.

Li et al., Automatic Layout Design of Plastic Injection Mould Cooling System, Computer-aided Design 37 (2005) 645-662.

International Search Report, U.S. Appl. No. 13/682,456, dated Aug. 2, 2013, 11 pages.

PCT Search Report and Written Opinion, dated Jan. 3, 2014, 12 pages.

U.S. Appl. No. 61/861,298, filed Aug. 1, 2013, Altonen et al.
U.S. Appl. No. 61/861,304, filed Aug. 1, 2013, Altonen et al.
U.S. Appl. No. 61/861,310, filed Aug. 1, 2013, Altonen et al.
U.S. Appl. No. 13/672,246, filed Nov. 8, 2012, Altonen et al.
U.S. Appl. No. 14/085,515, filed Nov. 20, 2013, Altonen et al.
U.S. Appl. No. 14/086,356, filed Nov. 20, 2013, Altonen et al.

\* cited by examiner

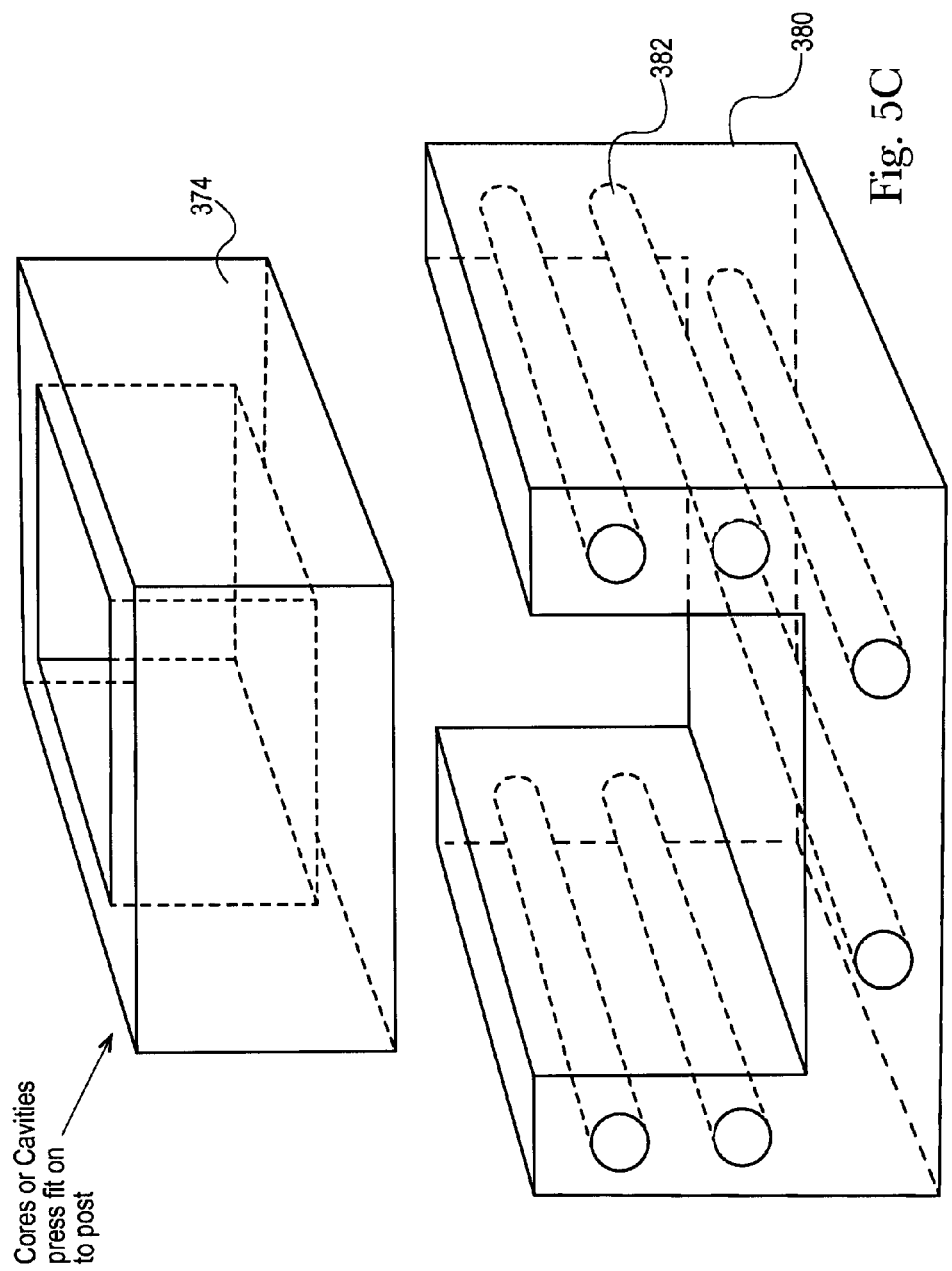

INJECTION MOLD HAVING A SIMPLIFIED COOLING SYSTEM

TECHNICAL FIELD

The present invention relates to injection molds, more particularly, to injection molds having a simplified cooling system.

BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. Such resin can include a masterbatch material along with one or more colorants, additives, fillers, etc. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. A molded part may have one or more gates. It is common for large parts to have two, three, or more gates to reduce the flow distance the polymer must travel to fill the molded part. The one or multiple gates per cavity may be located anywhere on the part geometry, and possess any cross-section shape such as being essentially circular or be shaped with an aspect ratio of 1.1 or greater. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to allow the part to be ejected from the mold.

The molten plastic resin is injected into the mold cavity and the plastic resin is forcibly pushed through the cavity by the injection molding machine until the plastic resin reaches the location in the cavity furthest from the gate. The resulting length and wall thickness of the part is a result of the shape of the mold cavity.

The molds used in injection molding machines must be capable of withstanding these high melt pressures. Moreover, the material forming the mold must have a fatigue limit that can withstand the maximum cyclic stress for the total number of cycles a mold is expected to run over the course of its lifetime. As a result, mold manufacturers typically form the mold from materials having high hardness, such as tool steels, having greater than 30 Rc, and more often greater than 50 Rc. These high hardness materials are durable and equipped to withstand the high clamping pressures required to keep mold components pressed against one another during the plastic injection process. Additionally, these high hardness materials are better able to resist wear from the repeated contact between molding surfaces and polymer flow.

High production injection molding machines (i.e., class 101 and class 102 molding machines) that produce thinwalled consumer products exclusively use molds having a majority of the mold made from the high hardness materials. High production injection molding machines typically produce 500,000 parts or more. Industrial quality production molds must be designed to produce at least 500,000 parts, preferably more than 1,000,000 parts, more preferably more than 5,000,000 parts, and even more preferably more than 10,000,000 parts. These high production injection molding machines have multi cavity molds and complex cooling systems to increase production rates. The high hardness materials described above are more capable of withstanding the repeated high pressure clamping and injection operations than lower hardness materials. However, high hardness materials, such as most tool steels, have relatively low thermal conductivities, generally less than 20 BTU/HR FT ° F., which leads to long cooling times as heat is transferred from the molten plastic material through the high hardness material to a cooling fluid.

In an effort to reduce cycle times, typical high production injection molding machines having molds made of high hardness materials include relatively complex internal cooling systems that circulate cooling fluid within the mold. These cooling systems accelerate cooling of the molded parts, thus allowing the machine to complete more cycles in a given amount of time, which increases production rates and thus the total amount of molded parts produced. However, these cooling systems add complexity and cost to the injection molds. In some class 101 molds more than 1 or 2 million parts may be produced, these molds are sometimes referred to as "ultra high productivity molds" Class 101 molds that run in 400 ton or larger presses are sometimes referred to as "400 class" molds within the industry.

High hardness materials are generally fairly difficult to machine. As a result, known high throughput injection molds require extensive machining time and expensive machining equipment to form, and expensive and time consuming post-machining steps to relieve stresses and optimize material hardness. Milling and/or forming cooling channels within these complex molds adds even more time and costs to the manufacture of typical high throughput injection molds.

There is a tradeoff between machining complexity and cooling efficiency in traditional, high hardness molds. Ideally, cooling channels should be machined as close to the mold cavity surfaces as possible. Additionally, conformal cooling is desirable and most effective. However, machining conformal cooling channels close to molding surfaces is difficult, time consuming, and expensive. Generally, machining cooling channels within about 5 mm of the mold surfaces is considered to be the practical limit. This practical limit reduces cooling efficiency due to material between the cooling fluid and the hot plastic having low thermal conductivity. Conventional machining techniques, along with conventional mold materials (i.e., high hardness and low thermal conductivity) place a lower limit on cycle time and cooling efficiency for a given mold.

Furthermore, locating cooling lines close to the mold surfaces requires precise machining of the cooling lines in the molds. Because the molds are attached to support plates when placed in a clamping device of the injection molding machine, fluid seals must be located where the cooling lines transition from the support plate to the mold (because the fluid circulating systems (e.g., pumps) must be located outside of the molds). These fluid seals may fail, causing cooling fluid to escape. As a result, parts may be incompletely cooled, which produces an inferior part, or the plastic in the mold may be contaminated with cooling fluid, which is also undesirable.

Still further, practical limitations on machining cooling channels results in unequal cooling within the mold. As a result, temperature gradients are produced within the mold cavity. Often the temperature of the surface of a mold cavity can vary by ten degrees Celsius or more. This wide variation in temperature within the mold can lead to imperfections in the molded parts.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 5A-5E illustrate different views of various mold assemblies having a plurality of cooling lines machined in a support plate;

DETAILED DESCRIPTION

Embodiments of the present invention generally relate to systems, machines, products, and methods of producing products by injection molding and more specifically to systems, products, and methods of producing products by low constant pressure injection molding.

The term "low pressure" as used herein with respect to melt pressure of a thermoplastic material, means melt pressures in a vicinity of a nozzle of an injection molding machine of 6000 psi and lower.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material do not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

Figure 1:
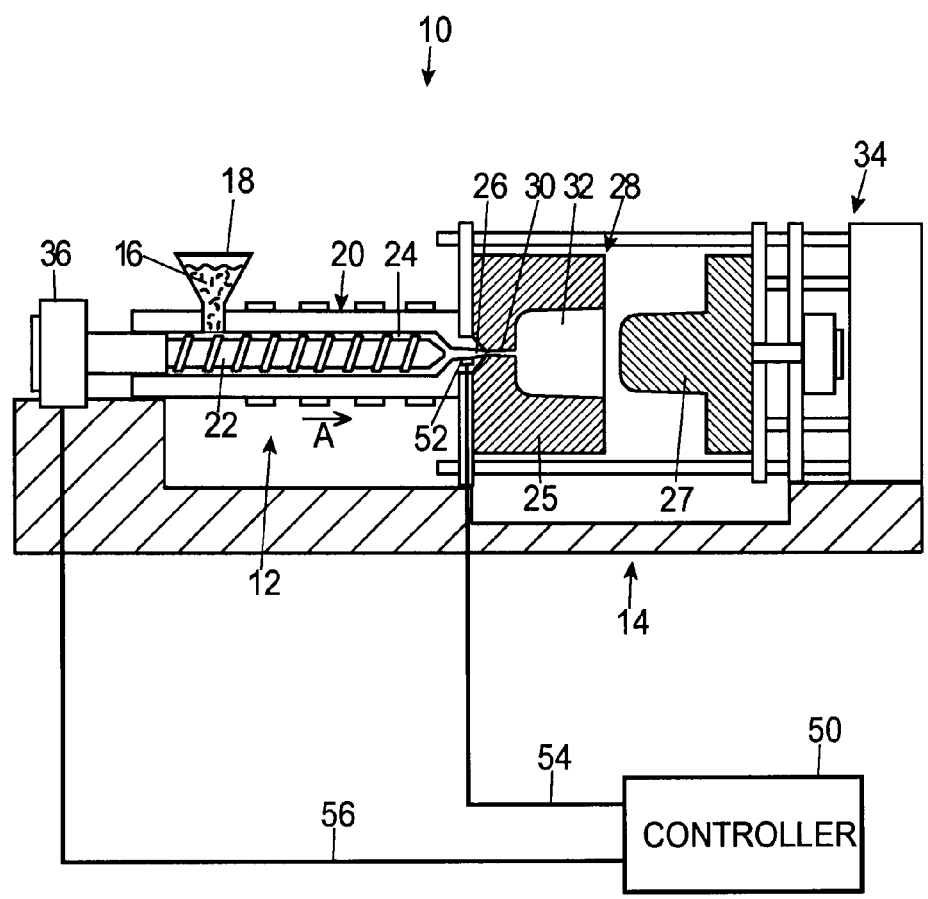
FIG. 1 illustrates a schematic view of an injection molding machine constructed according to the disclosure.

Referring to the figures in detail, FIG. 1 illustrates an exemplary low constant pressure injection molding apparatus 10 for producing thin-walled parts in high volumes (e.g., a class 101 or 102 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28. The molten thermoplastic material 24 may be injected through a gate 30, which directs the flow of the molten thermoplastic material 24 to the mold cavity 32. The mold cavity 32 is formed between first and second mold parts 25, 27 of the mold 28 and the first and second mold parts 25, 27 are held together under pressure by a press or clamping unit 34. The press or clamping unit 34 applies a clamping force that needs to be greater than the force exerted by the injection pressure acting to separate the two mold halves to hold the first and second mold parts 25, 27 together while the molten thermoplastic material 24 is injected into the mold cavity 32. To support these clamping forces, the clamping system 14 may include a mold frame and a mold base, the mold frame and the mold base being formed from a material having a surface hardness of more than about 165 BHN and preferably less than 260 BHN, although materials having surface hardness BHN values of greater than 260 may be used as long as the material is easily machineable, as discussed further below.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. The sensor 52 need not be in direct contact with the injected fluid and may alternatively be in dynamic communication with the fluid and able to sense the pressure of the fluid and/or other fluid characteristics. If the sensor 52 is not located within the nozzle 26, appropriate correction factors may be applied to the measured characteristic to calculate the melt pressure in the nozzle 26. In yet other embodiments, the sensor 52 need not be disposed at a location which is fluidly connected with the nozzle. Rather, the sensor could measure clamping force generated by the clamping system 14 at a mold parting line between the first and second mold parts 25, 27. In one aspect the controller 50 may maintain the pressure according to the input from sensor 52.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is an alarm that is activated when an overpressurization condition is detected.

Figure 2:
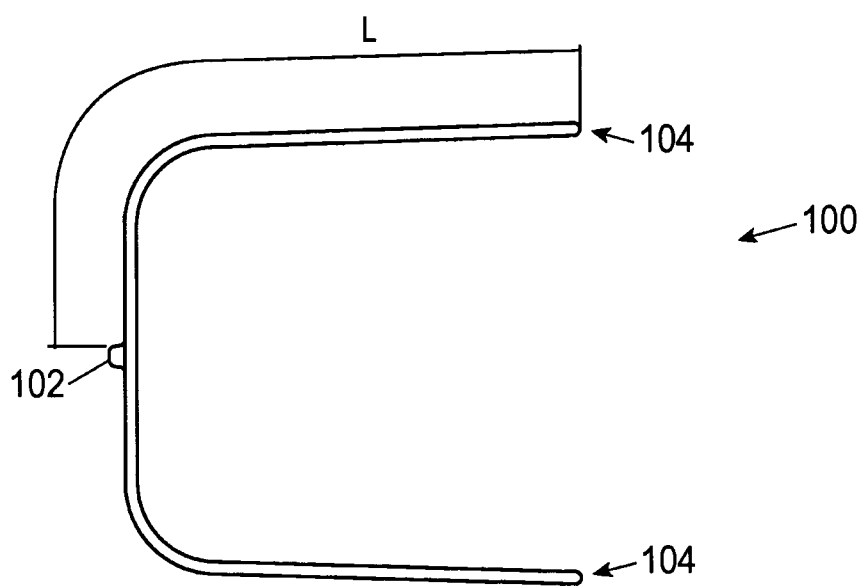
FIG. 2 illustrates one embodiment of a thin-walled part formed in the injection molding machine of FIG. 1.

Turning now to FIG. 2, an example molded part 100 is illustrated. The molded part 100 is a thin-walled part. Molded parts are generally considered to be thin-walled when a length of a flow channel L divided by a thickness of the flow channel T is greater than 100 (i.e., L/T>100). The low constant pressure injection molding systems and molds having simplified cooling that are described herein become increasingly advantageous for molding parts as L/T ratios increase, particularly for parts having L/T>200, or L/T>250 because the molten thermoplastic material includes a continuous flow front that advances through the mold cavity, which fills the mold cavity with thermoplastic material more consistently than high variable pressure injection molding systems. The length of the flow channel L is measured from a gate 102 to a flow channel end 104. Thin-walled parts are especially prevalent in the consumer products industry and healthcare or medical supplies industry.

For mold cavities having a more complicated geometry, the L/T ratio may be calculated by integrating the T dimension over the length of the mold cavity 32 from a gate 102 to the end of the mold cavity 32, and determining the longest length of flow from the gate 102 to the end of the mold cavity 32. The L/T ratio can then be determined by dividing the longest length of flow by the average part thickness. In the case where a mold cavity 32 has more than one gate 30, the L/T ratio is determined by integrating L and T for the portion of the mold cavity 32 filled by each individual gate and the overall L/T ratio for a given mold cavity is the highest L/T ratio that is calculated for any of the gates.

Thin-walled parts present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material into the mold at very high pressures, typically greater than 15,000 psi, so that the molten thermoplastic material rapidly fills the mold cavity before having a chance to cool and freeze off. This is one reason that manufacturers of the thermoplastic materials teach injecting at very high pressures. Another reason traditional injection molding machines inject molten plastic into the mold at high pressures is the increased shear, which increases flow characteristics, as discussed above. These very high injection pressures require the use of very hard materials to form the mold 28 and the feed system.

Traditional injection molding machines use molds made of tool steels or other hard materials to make the mold. While these tool steels are robust enough to withstand the very high injection pressures, tool steels are relatively poor thermal conductors. As a result, very complex cooling systems are machined into the molds to enhance cooling times when the mold cavity is filled, which reduces cycle times and increases productivity of the mold. However, these very complex cooling systems add great time and expense to the mold making process.

The inventors have discovered that shear-thinning thermoplastics (even minimally shear-thinning thermoplastics) may be injected into the mold 28 at low, substantially constant, pressure without any significant adverse affects. Examples of these materials include but are not limited to polymers and copolymers comprised of, polyolefins (e.g., polypropylene, polyethylene), thermoplastic elastomers, polyesters (e.g. polyethelyne terephthalate, polybutelene terephthalate), polystyrene, polyethylene furanoate (PEF), polycarbonate, poly(acrylonitrile-butadiene-styrene), poly(latic acid), polyhydroxyalkanoate, polyamides, polyacetals, ethylene-alpha olefin rubbers, and styrene-butadiene-stryene block copolymers. In fact, parts molded at low, substantially constant, pressures exhibit some superior properties as compared to the same part molded at a conventional high pressure. This discovery directly contradicts conventional wisdom within the industry that teaches higher injection pressures are better. Without being bound by theory, it is believed that injecting the molten thermoplastic material into the mold 28 at low, substantially constant, pressures creates a continuous flow front of thermoplastic material that advances through the mold from a gate to a farthest part of the mold cavity. By maintaining a low level of shear, the thermoplastic material remains liquid and flowable at much lower temperatures and pressures than is otherwise believed to be possible in conventional high pressure injection molding systems.

Figure 3:
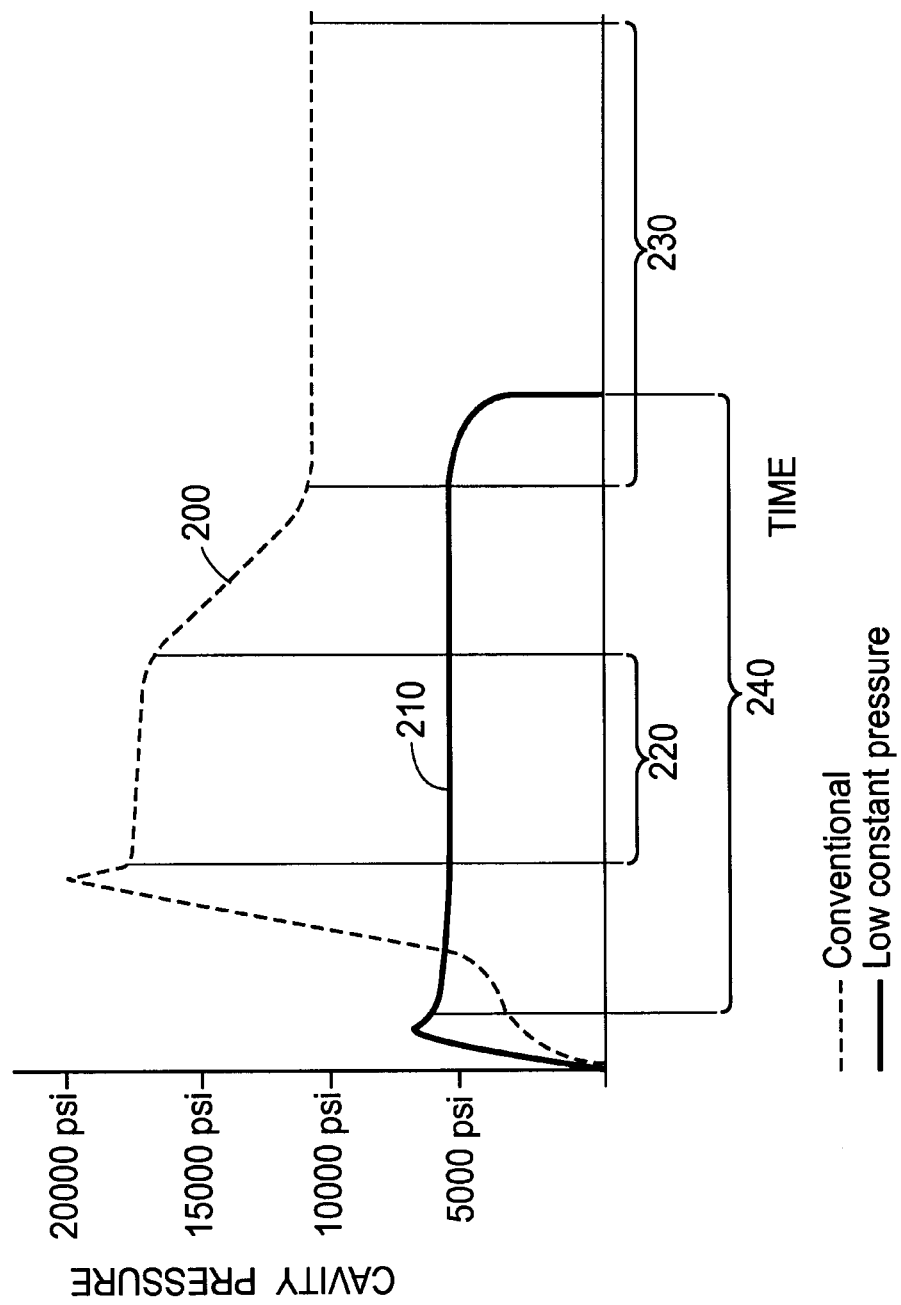
FIG. 3 is a cavity pressure vs. time graph for a mold cavity in a mold of the injection molding machine of FIG. 1.

Turning now to FIG. 3, a typical pressure-time curve for a conventional high pressure injection molding process is illustrated by the dashed line 200. By contrast, a pressure-time curve for the disclosed low constant pressure injection molding machine is illustrated by the solid line 210.

In the conventional case, melt pressure is rapidly increased to well over 15,000 psi and then held at a relatively high pressure, more than 15,000 psi, for a first period of time 220. The first period of time 220 is the fill time in which molten plastic material flows into the mold cavity. Thereafter, the melt pressure is decreased and held at a lower, but still relatively high pressure, 10,000 psi or more, for a second period of time 230. The second period of time 230 is a packing time in which the melt pressure is maintained to ensure that all gaps in the mold cavity are back filled. The mold cavity in a conventional high pressure injection molding system is filled from the end of the flow channel back to towards the gate. As a result, plastic in various stages of solidification are packed upon one another, which may cause inconsistencies in the finished product, as discussed above. Moreover, the conventional packing of plastic in various stages of solidification results in some non-ideal material properties, for example, molded-in stresses, sink, and non-optimal optical properties.

The constant low pressure injection molding system, on the other hand, injects the molten plastic material into the mold cavity at a substantially constant low pressure for a single time period 240. The injection pressure is less than 6,000 psi. By using a substantially constant low pressure, the molten thermoplastic material maintains a continuous melt front that advances through the flow channel from the gate towards the end of the flow channel. Thus, the plastic material remains relatively uniform at any point along the flow channel, which results in a more uniform and consistent finished product. By filling the mold with a relatively uniform plastic material, the finished molded parts may form crystalline structures that have better mechanical and/or better optical properties than conventionally molded parts. Amorphous polymers may also form structures having superior mechanical and/or optical properties. Moreover, the skin layers of parts molded at low constant pressures exhibit different characteristics than skin layers of conventionally molded parts. As a result, the skin layers of parts molded under low constant pressure can have better optical properties than skin layers of conventionally molded parts.

By maintaining a substantially constant and low (e.g., less than 6000 psi) melt pressure within the nozzle, more machineable materials may be used to form the mold 28. For example, the mold 28 illustrated in FIG. 1 may be formed of a material having a milling machining index of greater than 100% (such as 100-1000%, 100-900%, 100-800%, 100-700%, 100-600%, 100-500%, 100-400%, 100-300%, 100-250%, 100-225%, 100-200%, 100-180%, 100-160%, 100-150%, 100-140%, 100-130%, 100-120%, 100-110%, 120-250%, 120-225%, 120-200%, 120-180%, 120-160%, 120-150%, 120-140%, 120-130%, 140-400%, 150-300%, 160-250%, or 180-225%, or any other range formed by any of these values for percentage), a drilling machining index of greater than 100%, (such as 100-1000%, 100-900%, 100-800%, 100-700%, 100-600%, 100-500%, 100-400%, 100-300%, 100-250%, 100-225%, 100-200%, 100-180%, 100-160%, 100-150%, 100-140%, 100-130%, 100-120%, 100-110%, 120-250%, 120-225%, 120-200%, 120-180%, 120-160%, 120-150%, 120-140%, 120-130%, 140-400%, 150-300%, 160-250%, or 180-225%, or any other range formed by any of these values for percentage), a drilling machining index of greater than 100% (such as 100-1000%, 100-900%, 100-800%, 100-700%, 100-600%, 100-500%, 100-400%, 100-300%, 100-250%, 100-225%, 100-200%, 100-180%, 100-160%, 100-150%, 100-140%, 100-130%, 100-120%, 100-110%, 120-250%, 120-225%, 120-200%, 120-180%, 120-160%, 120-150%, 120-140%, 120-130%, 140-400%, 150-300%, 160-250%, or 180-225%, or any other range formed by any of these values for percentage), a wire EDM machining index of greater than 100% (such as 100-1000%, 100-900%, 100-800%, 100-700%, 100-600%, 100-500%, 100-400%, 100-300%, 100-250%, 100-225%, 100-200%, 100-180%, 100-160%, 100-150%, 100-140%, 100-130%, 100-120%, 100-110%, 120-250%, 120-225%, 120-200%, 120-180%, 120-160%, 120-150%, 120-140%, 120-130%, 140-400%, 150-300%, 160-250%, or 180-225%, or any other range formed by any of these values for percentage), a graphite sinker EDM machining index of greater than 200% % (such as 200-1000%, 200-900%, 200-800%, 200-700%, 200-600%, 200-500%, 200-400%, 200-300%, 200-250%, 300-900%, 300-800%, 300-700%, 300-600%, 300-500%, 400-800%, 400-700%, 400-600%, 400-500%, or any other range formed by any of these values for percentage), or a copper sinker EDM machining index of greater than 150% (such as 150-1000%, 150-900%, 150-800%, 150-700%, 150-600%, 150-500%, 150-400%, 150-300%, 150-250%, 150-225%, 150-200%, 150-175%, 250-800%, 250-700%, 250-600%, 250-500%, 250-400%, 250-300%, or any other range formed by any of these values for percentage). The machining indexes are based upon milling, drilling, wire EDM, and sinker EDM tests of various materials. The test methods for determining the machining indices are explained in more detail below. Examples of machining indexes for a sample of materials is compiled below in Table 1.

TABLE 1

| Material | | Machining Technology | | | | | | | | |
|---|---|---|---|---|---|---|---|---|---|---|
| | | Milling | | Drilling | | | | | | |
| | | Spindle | | Spindle | | Wire EDM | | Sinker EDM-Graphite | | Sinker EDM-Copper |
| | | Load | Index % | Load | Index % | time | Index % | time | Index % | time | Index % |
| 1117 steel* | | 0.72 | 100% | 0.32 | 100% | 9:34 | 100% | 0:14:48 | 100% | 0:24:00 | 100% |
| 6061 Aluminum alloy | | 0.50 | 144% | 0.20 | 160% | 4:46 | 201% | 0:05:58 | 248% | 0:15:36 | 154% |
| 7075 Aluminum alloy | | 0.55 | 131% | 0.24 | 133% | 4:48 | 199% | 0:05:20 | 278% | 0:12:27 | 193% |
| QC-10 Aluminum alloy | a | 0.56 | 129% | 0.24 | 133% | 4:47 | 200% | 0:05:11 | 286% | 0:12:21 | 194% |
| 4140 Steel | | 0.92 | 78% | 0.37 | 86% | 9:28 | 101% | 0:09:36 | 154% | 0:19:20 | 124% |
| 420 stainless steel | | 1.36 | 53% | 0.39 | 82% | 8:30 | 113% | 0:10:12 | 145% | 0:23:20 | 103% |
| A2 AISI tool set | | 0.97 | 74% | 0.45 | 71% | 8:52 | 108% | 0:08:00 | 185% | 0:20:12 | 119% |
| S7 AISI tool set | | 1.20 | 60% | 0.43 | 74% | 9:03 | 106% | 0:12:53 | 115% | 0:20:58 | 114% |

TABLE 1-continued

| | | Machining Technology | | | | | | | | | |
|---|---|---|---|---|---|---|---|---|---|---|---|
| | | Milling | | Drilling | | | | | | | |
| | | Spindle | | Spindle | | Wire EDM | | Sinker EDM-Graphite | | Sinker EDM-Copper | |
| Material | | Load | Index % | Load | Index % | time | Index % | time | Index % | time | Index % |
| P20 AISI mold set | | 1.10 | 65% | 0.38 | 84% | 9:26 | 101% | 0:11:47 | 126% | 0:20:30 | 117% |
| PX5AISI mold set | | 1.12 | 64% | 0.37 | 86% | 9:22 | 102% | 0:12:37 | 117% | 0:23:18 | 103% |
| MOLDMAX HH Beryllium copper mold alloy | b | 0.80 | 90% | 0.36 | 89% | 6:00 | 159% | 6:59:35 | 4% 1 | 0:43:38 | 55% 3 |
| AMPCOLOY 944 steel alloy | c | 0.62 | 116% | 0.32 | 100% | 6:53 | 139% | 3:13:41 | 8% 2 | 0:30:21 | 79% 4 | a - QC-10 available from Alcoa, Inc. of Pittsbugh, Pennsylvania, United States
b - MOLDMAX HH available from Brush Wellman, Inc. of Mayfield Heights, Ohio, United States
c - AMPCOLOY 944 available from Ampco Metal, SA of Marly, Switzerland
*1117 is the benchmark material for this test. Published data references 1212 carbon steel as the benchmark material. 1212 was not readily available. Of the published data, 1117 was the closest in composition and machining index percentage (91%).
1 Significant graphite electrode wear: ~20%
2 graphite electrode wear: ~15%
3 Cu electrode wear: ~15%
4 Cu electrode wear: ~3%

Using easily machineable materials to form the mold 28 results in greatly decreased manufacturing time and thus, a decrease in manufacturing costs. Moreover, these machineable materials generally have better thermal conductivity than tool steels, which increases cooling efficiency and decreases the need for complex cooling systems.

When forming the mold 28 of these easily machineable materials, it is also advantageous to select easily machineable materials having good thermal conductivity properties. Materials having thermal conductivities of more than 30 BTU/HR FT ° F. are particularly advantageous. In particular, these materials can have thermal conductivities (measured in BTU/HR FT ° F). of 30-10 200, 30-180, 30-160, 30-140, 30-120, 30-100, 30-80, 30-60, 30-40, 40-200, 60-200, 80-200, 100-200, 120-200, 140-200, 160-200, 180-200, 40-200, 40-180, 40-160, 40-140, 40-120, 40-100, 40-80, 40-60, 50-140, 60-140, 70-140, 80-140, 90-140, 100-140, 110-140, 120-140, 50-130, 50-120, 50-110, 50-100, 50-90, 50-80, 50-70, 50-60, 60-130, 70-130, 80-130, 90-130, 100-130, 110-130, 120-130, 60-120, 60-110, 60-100, 60-90, 60-80, 60-70, 70-130, 70-120, 70-110, 70-100, 70-90, 15 70-80, 70-110, 70-100, 70-90, 70-80, 80-120, 80-110, 80-100, or 80-90, or any other range formed by any of these values for thermal conductivity. For example easily machineable materials having good thermal conductivities include, but are not limited to, QC-10 (an aluminum alloy available from Alcoa, Inc. of Pittsburgh, Pa., United States), DURAMOLD-5 (an aluminum alloy available from Vista Metals, Corp. of Fontana, Calif., United States) and HOKOTOL (an aluminum alloy available from Aleris International, Inc. of Beachwood, Ohio, United States). Materials with good thermal conductivity more efficiently transmit heat from the thermoplastic material out of the mold. As a result, more simple cooling systems may be used.

Figure 4:
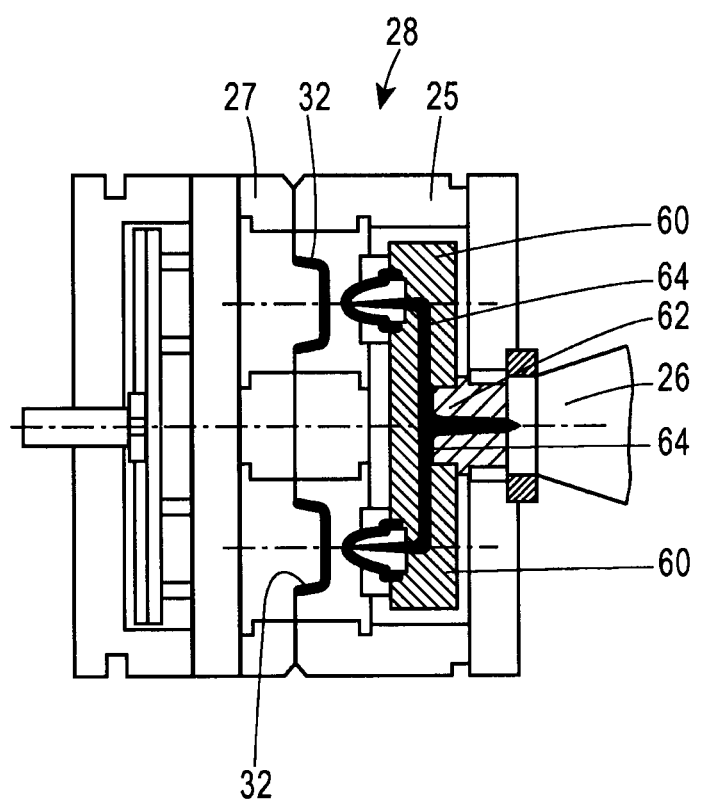
FIG. 4 is a cross-sectional view of one embodiment of a mold assembly of the injection molding machine of FIG. 1.

One example of a multi-cavity mold assembly 28 is illustrated in FIG. 4. Multi-cavity molds generally include a feed manifold 60 that directs molten thermoplastic material from the nozzle 26 to the individual mold cavities 32. The feed manifold 60 includes a sprue 62, which directs the molten thermoplastic material into one or more runners or feed channels 64. Each runner 64 may feed multiple mold cavities 32. High productivity molds may include four or more mold cavities 32, sometimes as many as three hundred and eighty four mold cavities 32, and often also may include heated runners 64. Some embodiments of constant low pressure injecting molding machines may include non-naturally balanced feed systems, such as artificially balanced feed systems, or non-balanced feed systems.

Drilling and Milling Machineability Index Test Methods

The drilling and milling machineability indices listed above in Table 1 were determined by testing the representative materials in carefully controlled test methods, which are described below.

The machineability index for each material was determined by measuring the spindle load needed to drill or mill a piece of the material with all other machine conditions (e.g., machine table feed rate, spindle rpm, etc.) being held constant between the various materials. Spindle load is reported as a ratio of the measured spindle load to the maximum spindle torque load of 75 ft-lb at 1400 rpm for the drilling or milling device. The index percentage was calculated as a ratio between the spindle load for 1117 steel to the spindle load for the test material.

The test milling or drilling machine was a Haas VF-3 Machining Center.

TABLE 2

| Drilling Conditions | |
|---|---|
| Spot Drill | 118 degree 0.5" diameter, drilled to 0.0693" depth |
| Drill Bit | 15/32" diameter high speed steel uncoated jobber length bit |
| Spindle Speed | 1200 rpm |
| Depth of Drill | 0.5" |
| Drill Rate | 3 in/min |
| Other | No chip break routine used |

TABLE 3

| Milling Conditions | |
|---|---|
| Mill | 0.5" diameter 4 flute carbide flat bottom end mill, uncoated (SGS part # 36432 www.sgstool.com) |
| Spindle Speed | 1200 rpm |
| Depth of Cut | 0.5" |
| Stock Feed Rate | 20 in/min |

For all tests "flood blast" cooling was used. The coolant was Koolrite 2290.

EDM Machineability Index Test Methods

The graphite and copper sinker EDM machineability indices listed above in Table 1 were determined by testing the representative materials in a carefully controlled test method, which is described below.

The EDM machineability index for the various materials were determined by measuring the time to burn an area (specifics below) into the various test metals. The machineability index percentage was calculated as the ratio of the time to burn into 1117 steel to time required to burn the same area into the other test materials.

TABLE 4

Wire EDM

| | |
|---|---|
| Equipment | Fanuc OB |
| Wire | 0.25 mm diameter hard brass |
| Cut | 1" thick × 1" length (1 sq. ") |
| Parameters | Used Fanuc on board artificial intelligence, override at 100% |

TABLE 5

Sinker EDM-Graphite

| | |
|---|---|
| Equipment | Ingersoll Gantry 800 with Mitsubishi EX Controller |
| Wire | System 3R pre-mounted 25 mm diameter Poco EDM 3 graphite |
| Cut | 0.1" Z axis plunge |
| Parameters | Used Mitsubishi CNC controls with FAP EX Series Technology |

TABLE 6

Sinker EDM-Copper

| | |
|---|---|
| Equipment | Ingersoll Gantry 800 with Mitsubishi EX Controller |
| Wire | System 3R pre-mounted 25 mm diameter Tellurium Copper |
| Cut | 0.1" Z axis plunge |
| Parameters | Used Mitsubishi CNC controls with FAP EX Series Technology |

The disclosed low constant pressure injection molding machines advantageously employ molds constructed from easily machineable materials. As a result, the disclosed low constant pressure injection molds (and thus the disclosed low constant pressure injection molding machines) are less expensive and faster to produce. Additionally, the disclosed low constant pressure injection molding machines are capable of employing more flexible support structures and more adaptable delivery structures, such as wider platen widths, increased tie bar spacing, elimination of tie bars, lighter weight construction to facilitate faster movements, and non-naturally balanced feed systems. Thus, the disclosed low constant pressure injection molding machines may be modified to fit delivery needs and are more easily customizable for particular molded parts.

Moreover, the disclosed low constant pressure injection molds (e.g., mold assemblies that include one or more mold sides and one or more support plates) may include simplified cooling systems relative to cooling systems found in conventional high pressure injection molds. The simplified cooling systems are more economical than conventional cooling systems because the simplified cooling systems are more quickly and easily produced. Additionally, the simplified cooling systems use less coolant, which further reduces cooling costs during molding operations. In some cases, the simplified cooling systems may be located solely in the mold support plates, which allows the molds to be changed without the need for changing the cooling system. In summary, the simplified cooling systems of the disclosed low constant pressure injection molding molds are more economical than conventional complex cooling systems found in conventional high pressure injection molds.

Cooling systems of all sorts may be categorized in a system of cooling complexity levels, with cooling complexity level zero representing the most simple cooling system and higher cooling complexity levels representing progressively more complex cooling systems. This system of cooling system categorization is discussed below in more detail. However, conventional high productivity consumer product injection molding machines (e.g., class 101 and 102 molding machines) employ complex cooling systems to reduce cycle time and improve productivity. Generally speaking, high productivity consumer product injection molding machines include complex cooling systems (i.e., cooling systems having a level four cooling system complexity level or higher). Level zero to level three cooling complexity level systems generally do not produce cooling capacity that is sufficient for conventional high productivity injection molds, which include molds made of high hardness, low thermal conductivity materials.

Advantageously, the disclosed low constant pressure injection molds include cooling systems having cooling complexity levels of three or less, preferably cooling complexity level three, two, or one, which lowers production costs and increases efficiency over conventional high pressure injection molding machines.

As used herein, a cooling complexity level zero mold assembly is defined as a mold assembly that includes no active cooling system. In other words, a cooling complexity level zero mold assembly is only passively cooled through the conduction of heat through the mold sides and support plates, and eventually to the atmosphere surrounding the mold assembly. Cooling complexity level zero mold assemblies typically have relatively long cycle times (as it takes a significant amount of time for the plastic within the mold to freeze because of the slow cooling rate). As a result, high productivity consumer product mold assemblies (e.g., mold assemblies used in class 101-102 molding machines) do not use cooling complexity level zero mold assemblies.

Turning now to FIGS. 5A-5E, different embodiments of a cooling complexity level one mold assembly 328 (and/or different embodiments of a support plate in the mold assembly) are illustrated. The mold assembly 328 may include a mold 370 having a first side 372 and a second side 374. The first side 372 and the second side 374 form a mold cavity 376 therebetween. The first side 372 may be supported by a first support plate 378 and the second side 374 may be supported by a second support plate 380. The first and second support plates 378, 380 may be attached to a press (not shown), which actuates to move the first and second sides 372, 374 during the molding process. One or more cooling lines 382 may be formed in one or more of the support plates 378, 380. Because the first and second sides 372, 374 are made from a highly thermally conductive material, heat flows through the first and second sides 372, 374 to the support plates 378, 380 at a rate that is sufficient to cool plastic in the mold cavity 376 in an acceptable amount of time.

Figure 5A:
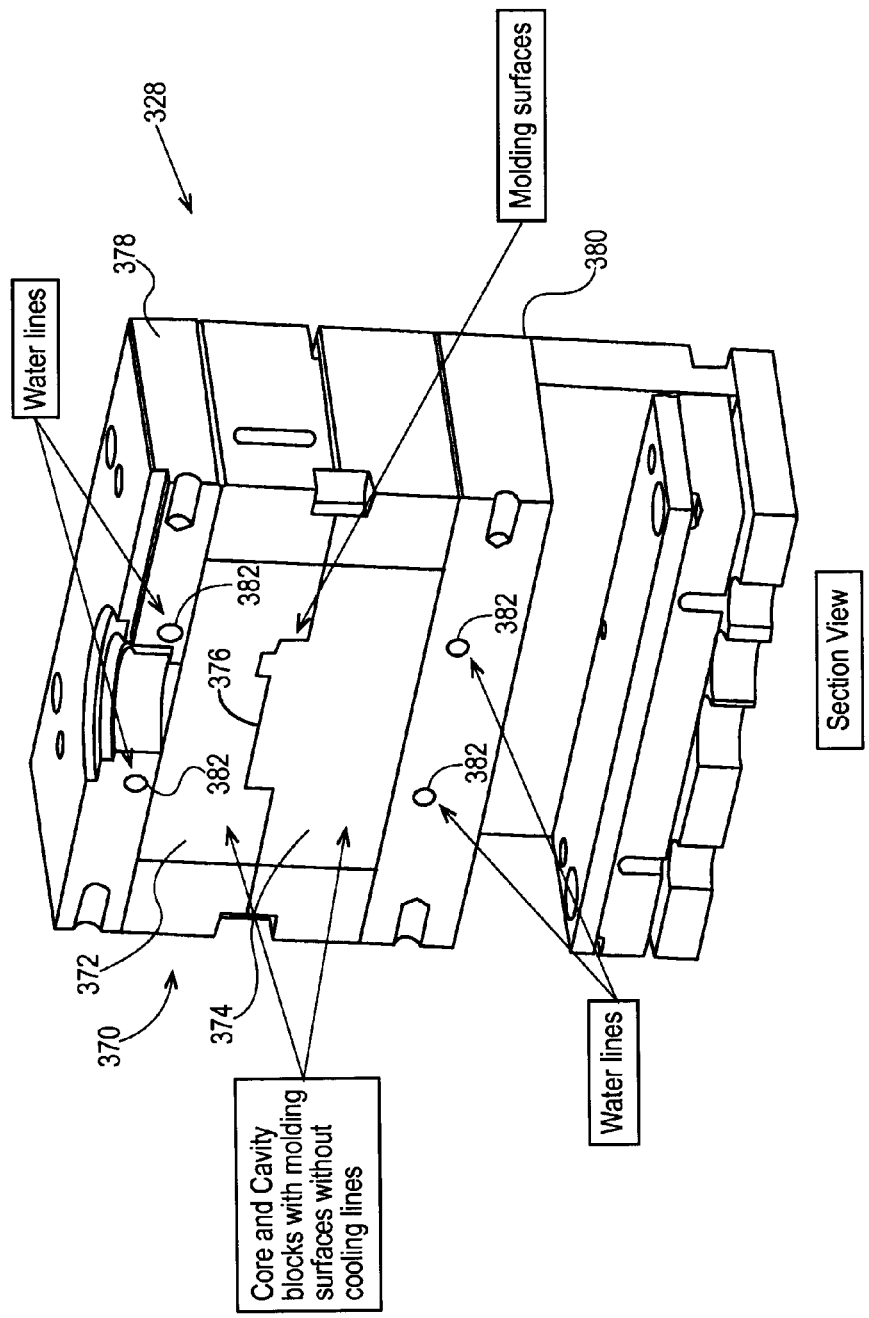
Figure 5B:
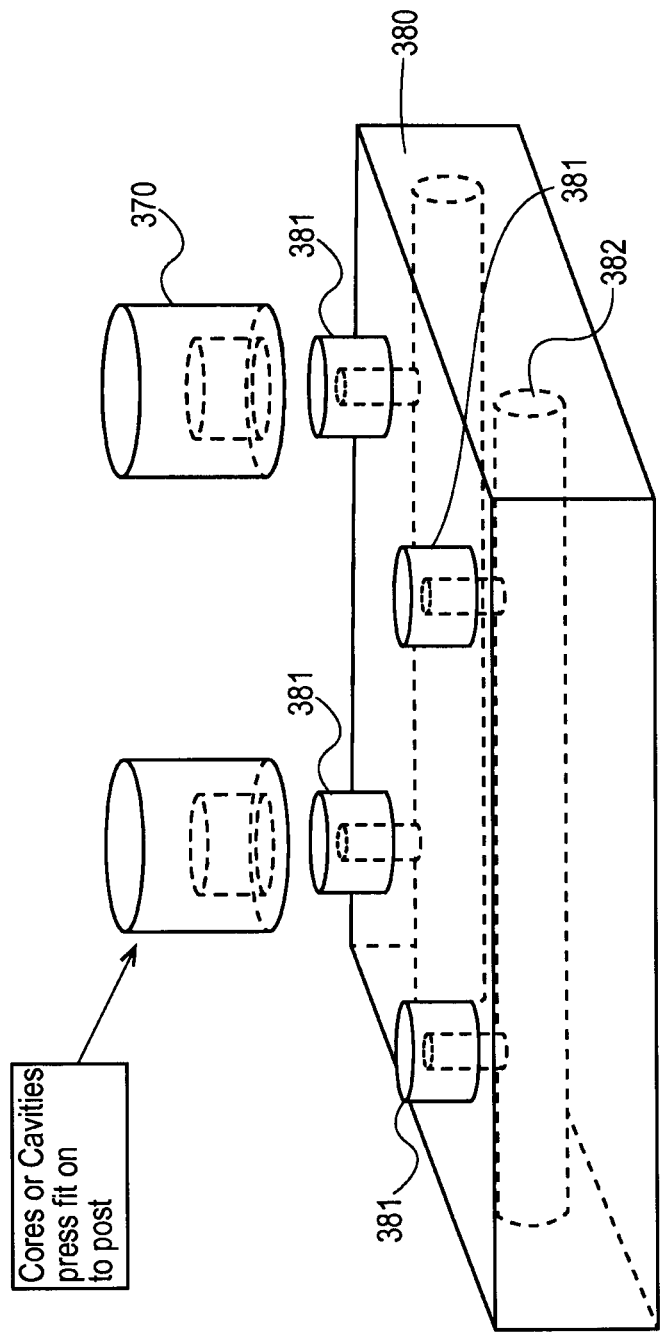
Figure 5D:
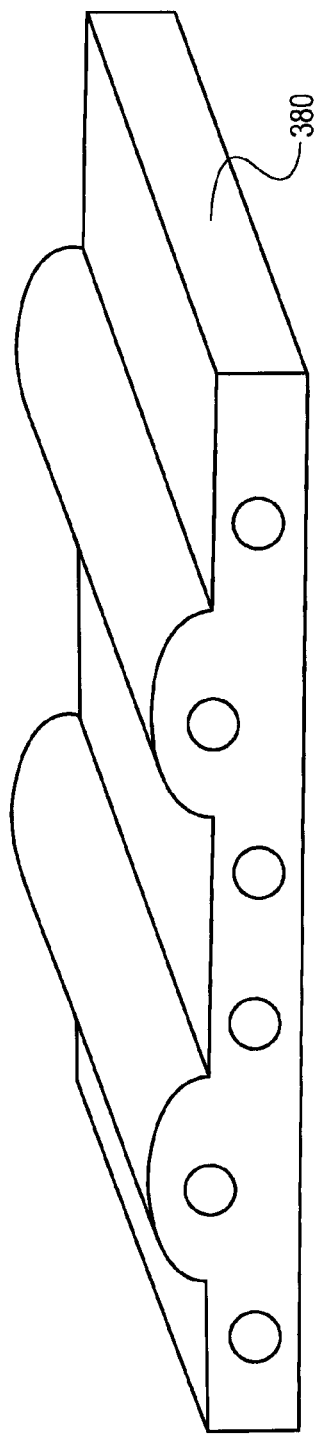
Figure 5E:
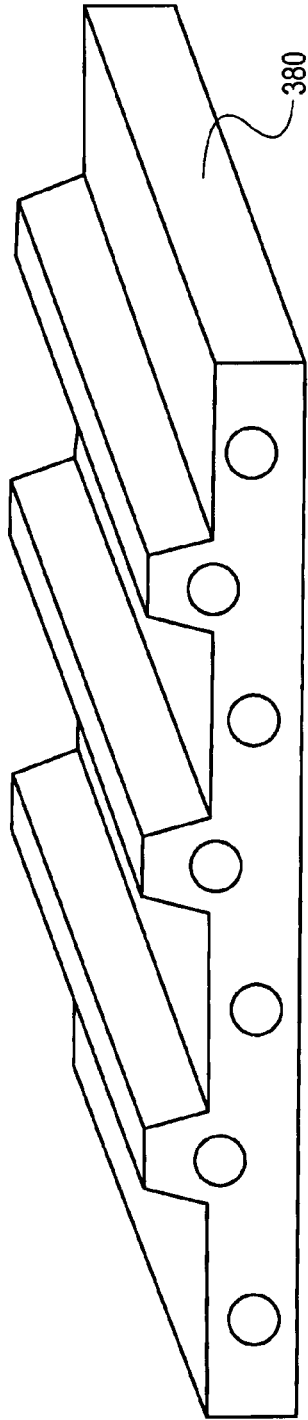

The support plates 378, 380 may include posts or other projections 381 that extend outward, away from the support plate 378, 380, towards the mold 370. The cooling lines 382 may extend into the posts 381, which can form cores for the mold 380. The posts 381 can be configured to fit together with recesses in the mold 370, to form the mold cavities. For example, the projection of the embodiment of FIG. 7 can be used with the cooling lines 382, and the projection can be configured to extend inside any of the posts 381, of the embodiment of FIG. 5B. Any of the posts 381 can be configured to be cylindrical, as shown in FIG. 5B, or tapered, or any other workable shape, in any convenient size, for fitting as a mold core or mold cavity. Any of the posts 381 can be configured to partially or fully rest on an outer surface of the mold 380 or a mold receiving plate, or to extend into a recess or hole within an outer surface of the mold 380 or a mold receiving plate.

The projection of the cooling line, the post 381, and the mold 370, in FIG. 5B, can be configured together in any workable combination either as a unitary structure, or as a structure of permanently connected elements, or as a structure of interchangeable elements. As an example, a projected cooling line from FIG. 7 and a post 381 can together form an interchangeable boss, which can be removably connected into a mold and/or a mold receiving plate, and thus be connected into cooling lines in that mold or plate. As another example, a projected cooling line from FIG. 7 can be configured to be interchangeable with posts of various sizes and shapes, for different molds; and when a projected cooling line can be removably connected from such a post, this offers an additional degree of flexibility in the molding process, with the ability to quickly change a molding machine from one mold to another mold, without having to remove the cooling line(s) and the receiving plate(s) during the change.

As a particular example, a post 381 and a cavity in a mold 370 can be sized and positioned such that the whole geometry of the molded part can be maintained in the mold cavity formed by the post 381. In this way, the molding surfaces of the cavity can be continuous, and no witness line should be present on the molded part, which provides an aesthetic and design benefit. Optionally, the mold cavity can be sized and/or positioned with stackable plates to create the necessary heights for the molding surfaces and/or the mold can be configured with movable slide plates (sometimes referred to as stripper plates), mounted between the cavity and the core, which can have mechanical or hydraulic actuations. Further, this particular example can also be used with interchangeable parts, as described above.

The mold 370 may include a complementary feature so that the mold may fit around (FIG. 5B), within (FIG. 5C), or upon (FIGS. 5D and 5E) the posts 381. In this way, the cooling lines 382 may be located closer to the mold cavity without extending the cooling lines 382 into the mold 370 or into the first and second mold sides 372, 374. As a result, the support plates 378, 380 may receive molds having a variety of different mold cavity shapes. The molds may thus be formed without cooing lines integrated into the first and/or second sides 372, 374, which reduces manufacturing costs of the molds 370.

Conventional high output consumer product injection mold assemblies do not use cooling complexity level one mold assemblies because such mold assemblies do not adequately cool plastic with in a mold cavity formed by two high hardness, low thermal conductivity materials. Cooling complexity level one mold assemblies are defined as containing all active cooling lines 382 within the support plates 378, 380, even if more than one machining axis is needed to form the cooling lines 382. In the example of FIGS. 5A-5E, the mold may be a stack mold, a cube mold, a shuttle mold, a helicopter mold, a mold having rotating platens, or other multi-cavity molds to increase productivity if desired.

Figure 6:
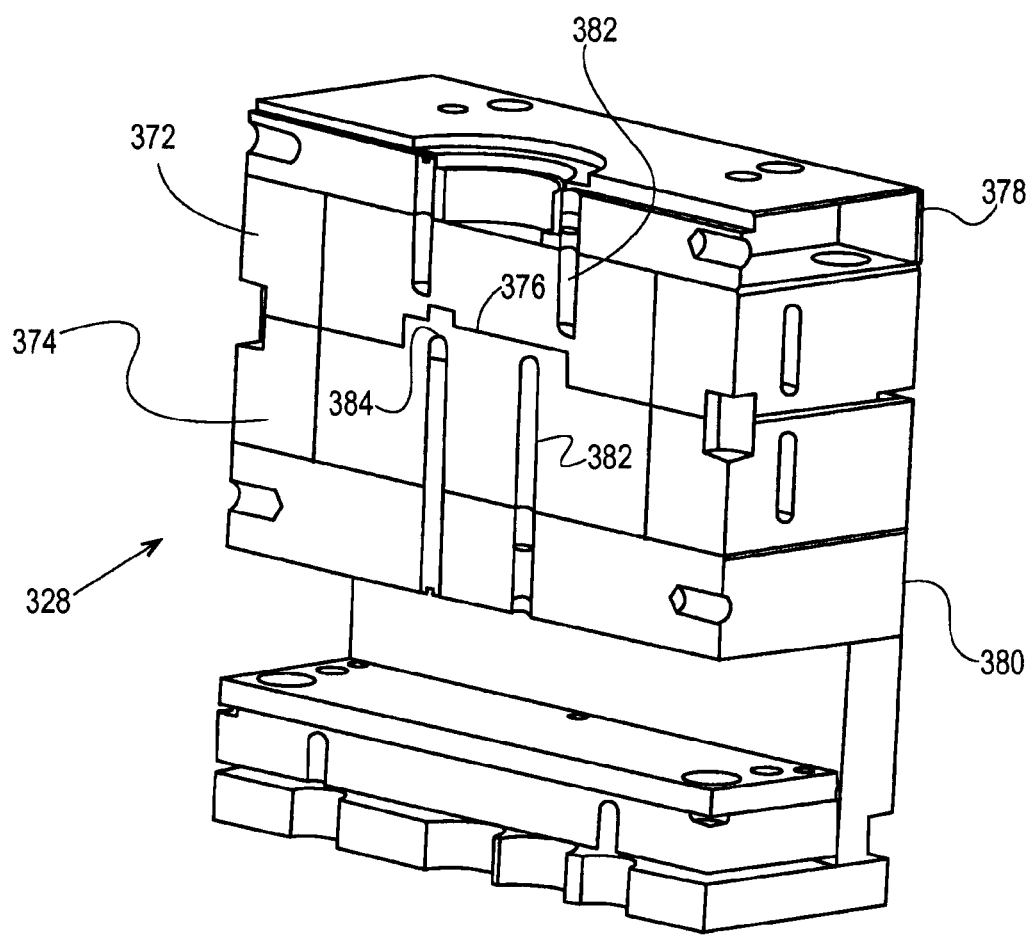
FIG. 6 illustrates a cross-sectional view of a mold assembly having a plurality of cooling lines machined in a support plate that extend into a mold side.

Turning now to FIG. 6, a cooling complexity level two mold assembly 328 is illustrated. The cooling complexity level two mold assembly 328 is identical to the cooling complexity level one mold assembly 328 of FIG. 5, with the exception that the cooling lines 382 in the embodiment of FIG. 6 extend through at least one support plate 378, 380 and into at least one mold side 372, 374 (i.e., as opposed to the cooling lines 382 only extending through the support plates 378, 380). The cooling lines 382 have terminal ends 384. However, each cooling line 382 is machined along an axis that is parallel to a single machining axis.

Figure 7:
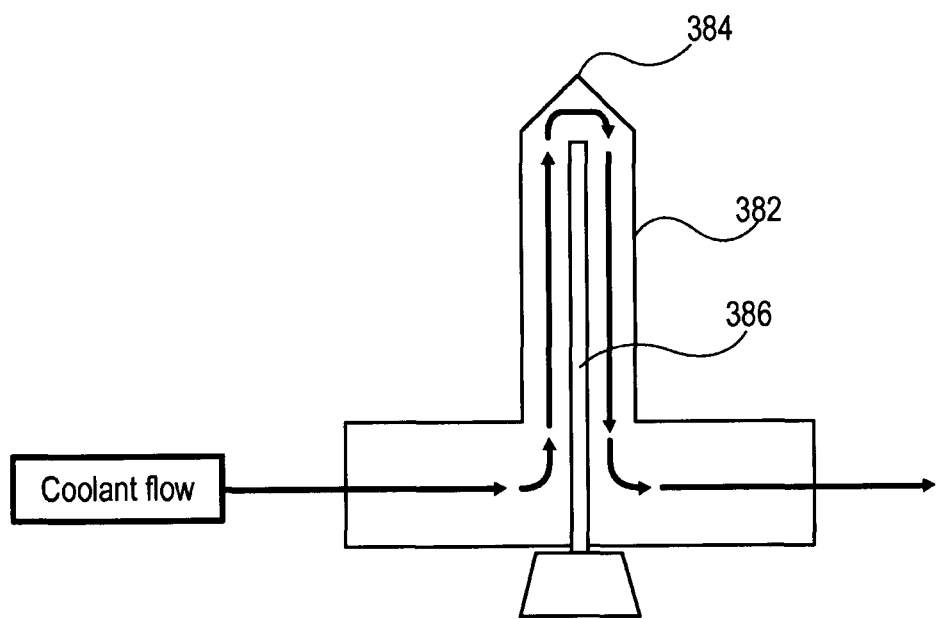
FIG. 7 illustrates a close-up sectional view of a cooling line including a baffle.

The cooling lines 382 may extend outward to form a projection which includes a baffle 386, as shown in more detail in FIG. 7, to facilitate cooling fluid flow through the cooling line 382. In an alternative embodiment of FIG. 7, the baffle 386 can be replaced with a spiral cavity that extends outward through and into the projection, so cooling fluid can flow in one side of the base of the projection, through the spiral cavity, and out the other side of the base. In another alternative embodiment of FIG. 7, the baffle 386 can be replaced with a bubbler cavity that extends outward through and into the projection, so cooling fluid can flow around the inside of the projection.

Cooling complexity level two mold assemblies have not been used in high output consumer product injection molding machines (i.e., class 101-102 injection molding machines) because cooling complexity level two mold assemblies do not have enough flexibility to machine cooling lines close to the mold surfaces of the mold cavity and therefore, cooling complexity level two mold assemblies do not provide adequate cooling for conventional high output mold assemblies having high hardness, low thermal conductivity molds.

Figure 8:
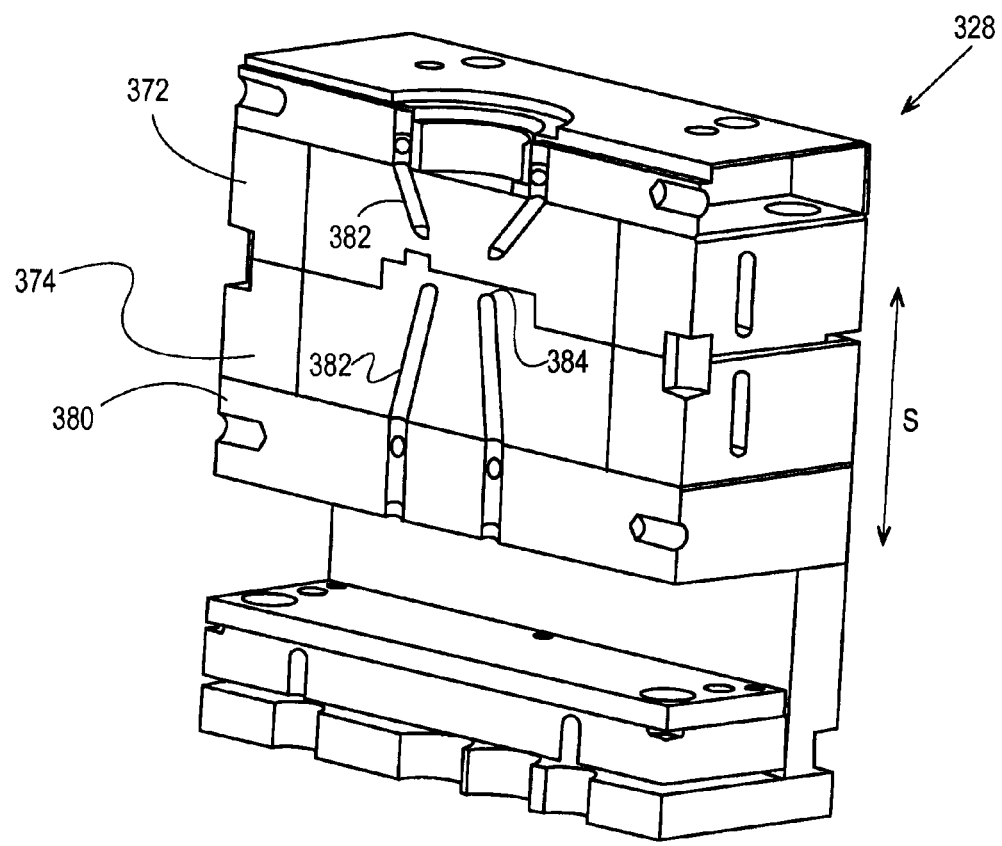
FIG. 8 illustrates a perspective cross-sectional view of a mold assembly including a plurality of cooling lines machined along at least two different axes.

Turning now to FIG. 8 an embodiment of a cooling complexity level three mold assembly 328 is illustrated. A cooling complexity level three mold assembly 328 is defined by cooling channels 382 having at least two different machining axes. At least one cooling line 382 may include two different machining axes and a terminal end. More particularly, the cooling line 382 may have a bend or turn. For example, the cooling line 382 may include a first machining axis that is substantially parallel to the opening-closing stroke S of the mold assembly 328 and a second machining axis that is angled with respect to the first machining axis. Like cooling complexity level two mold assemblies, cooling complexity level three mold assemblies have not been used in high output consumer product injection molding machines (e.g., class 101-102 injection molding machines) because level three cooling complexity does not have enough flexibility to machine cooling lines close to the mold surfaces of the mold cavity and therefore, cooling complexity level three mold assemblies do not provide adequate cooling for conventional high output mold assemblies having high hardness, low thermal conductivity molds.

Figure 9:
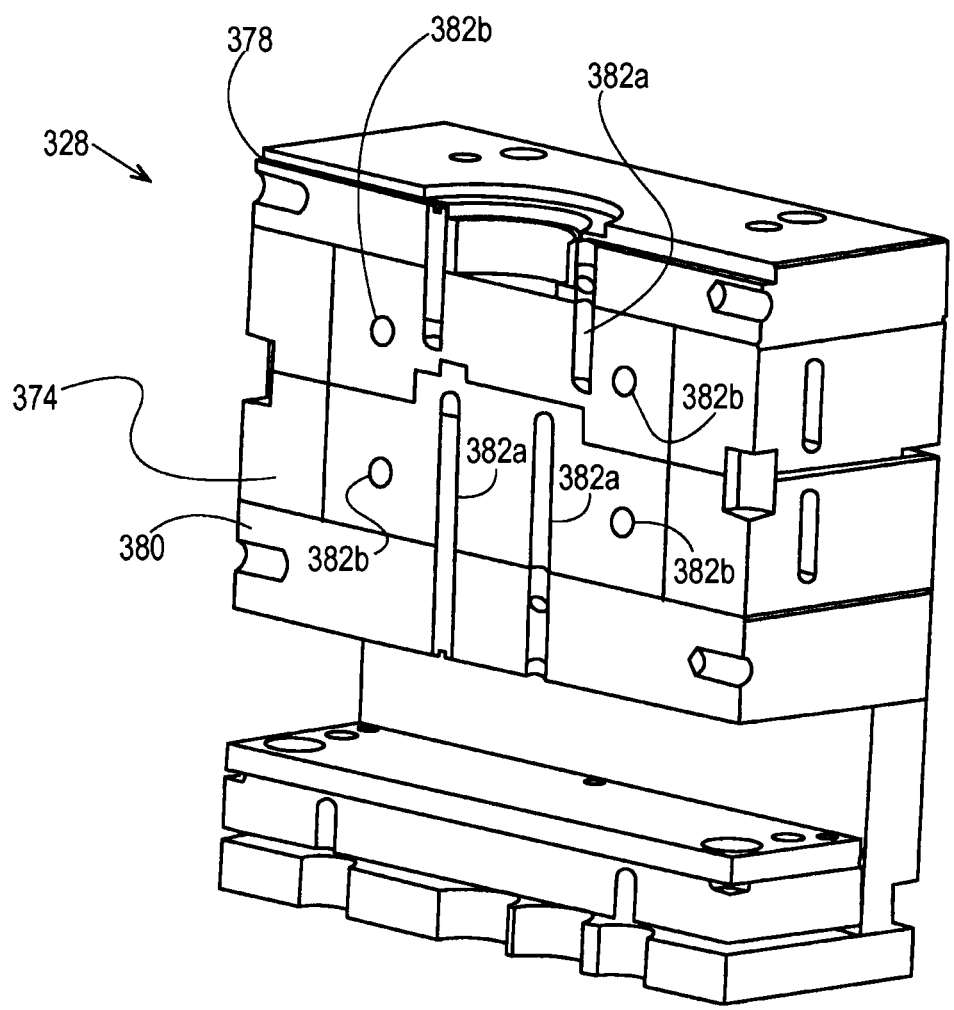
FIG. 9 illustrates a perspective cross-sectional view of a mold assembly having a plurality of terminal cooling lines and a plurality of through bore cooling lines machined along at least two different machining axes.

Turning now to FIG. 9, a cooling complexity level four mold assembly 328 is illustrated. The cooling complexity level four mold assembly 328 includes a plurality of cooling lines 382, a first cooling line 382a having a terminal end 384 and a second cooling line 382b being a through-bore without a terminal end. The first cooling line 382a extends from the support plate 378 into the first mold side 372 and the second cooling line 382b extends through the first mold side 372. A machining axis for the first cooling line 382a is different from a machining axis for the second cooling line 382b. In other words, the cooling lines 382 have at least two different machining axes for formation. Cooling complexity level four mold assemblies have been used in some high output consumer product injection molding machines (e.g., class 101-102 injection molding machines) having mold assemblies with very simple mold cavity geometries.

Figure 10:
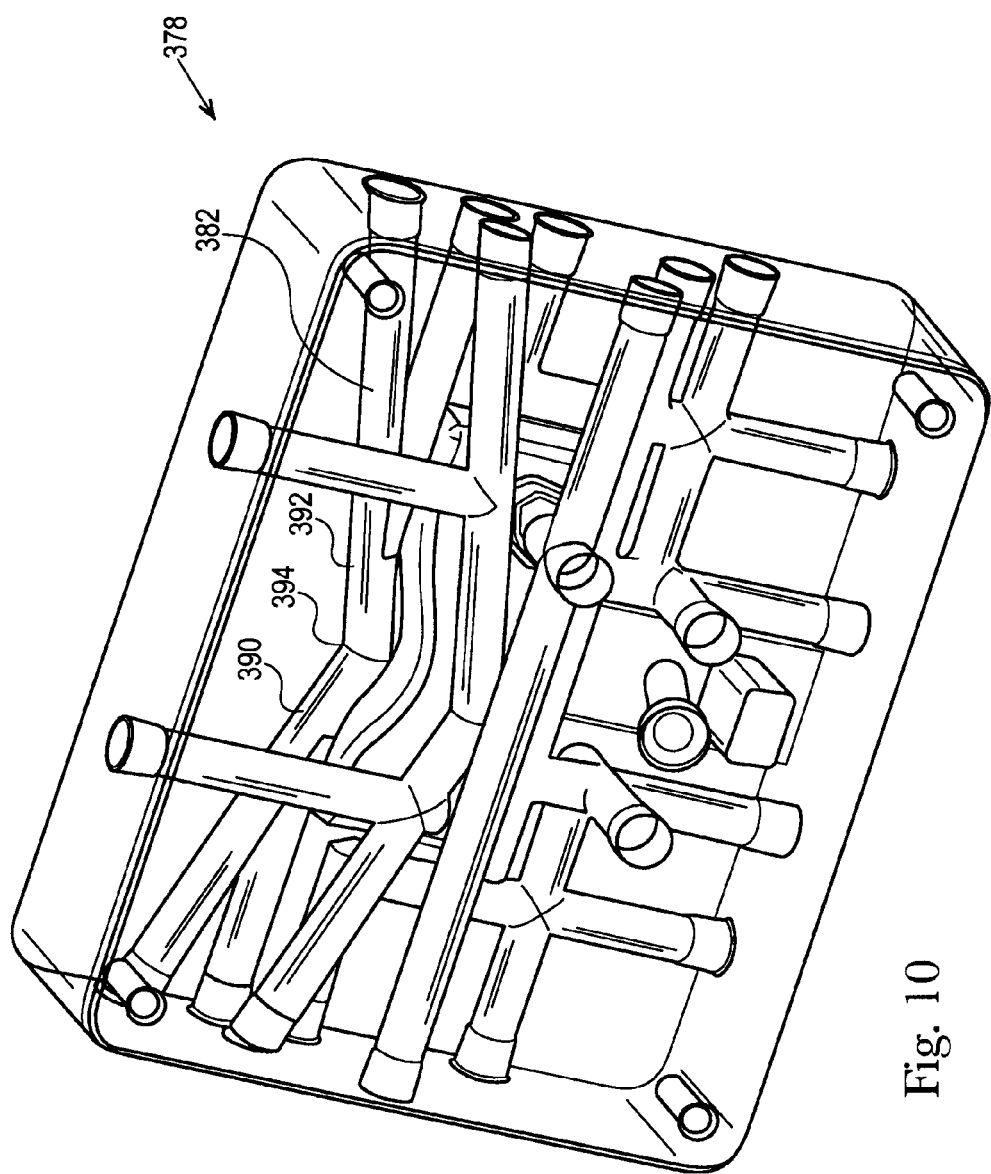
FIG. 10 illustrates a perspective partially transparent view of a mold assembly having a plurality of cooling lines, at least one of the cooling lines being formed by two terminal cooling lines that join one another at terminal ends to form a non-terminal cooling line, each terminal cooling line being machined along a different machining axis.

Turning now to FIG. 10, a cooling complexity level five mold assembly 328 is illustrated. The cooling complexity level five mold assembly 328 includes a first cooling line 382 that is a through-bore having two different machining axes. As illustrated in FIG. 10, the first cooling line 382 includes a first section 390 and a second section 392 that are angled with respect to one another and meet at a junction or turn 394. Machining the first cooling line 382 with two different axes that must meet at an internal location in the mold part requires great precision and thus more costly equipment, along with a greater manufacturing time. However, cooling complexity level five mold assemblies 328 have been used in high output consumer product injection molding machines (e.g., class 101-102 injection molding machines) because cooling complexity level five mold assemblies allow for greater customization in cooling line placement. Thus, cooling lines can be placed closer to the mold cavity than in cooling complexity mold assemblies of lesser complexity. As a result, the more complex cooling complexity mold assembly can at least partially offset the drawback of lower thermal conductivity found in conventional injection molds made of high hardness, low thermal conductivity materials.

Figure 11:
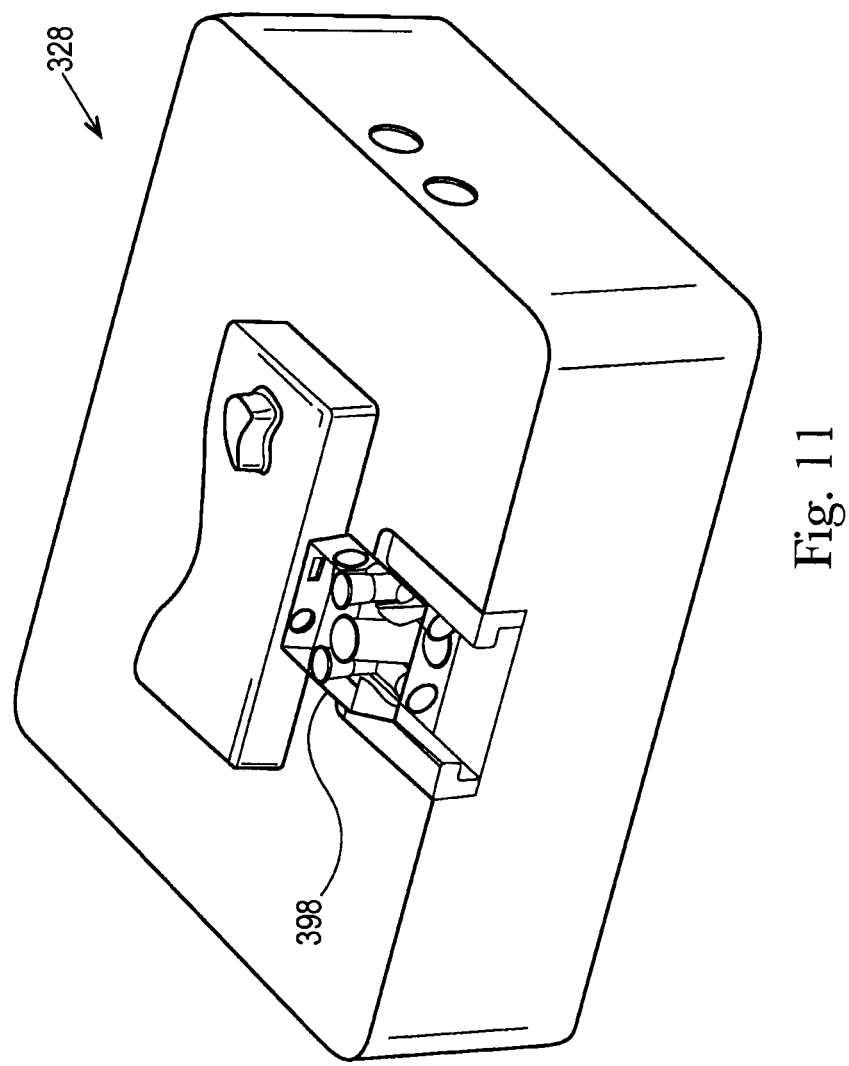
FIG. 11 illustrates a perspective view of a mold assembly having an actively cooled dynamic part.

Turning now to FIG. 11, a cooling complexity level six mold assembly 328 is illustrated. The cooling complexity level six mold assembly 328 is a cooling complexity level one to five mold assembly that also includes at least one actively cooled dynamic molding part 398. Forming cooling channels in a dynamic molding part 398 requires great precision. Moreover, actively cooled dynamic molding parts 398 require complicated flow mechanisms that move with the dynamic molding part 398 during operation of the mold assembly 328. Cooling complexity level six mold assemblies have been used in high output consumer product injection molding machines (e.g., class 101-102 injection molding machines).

Figure 12:
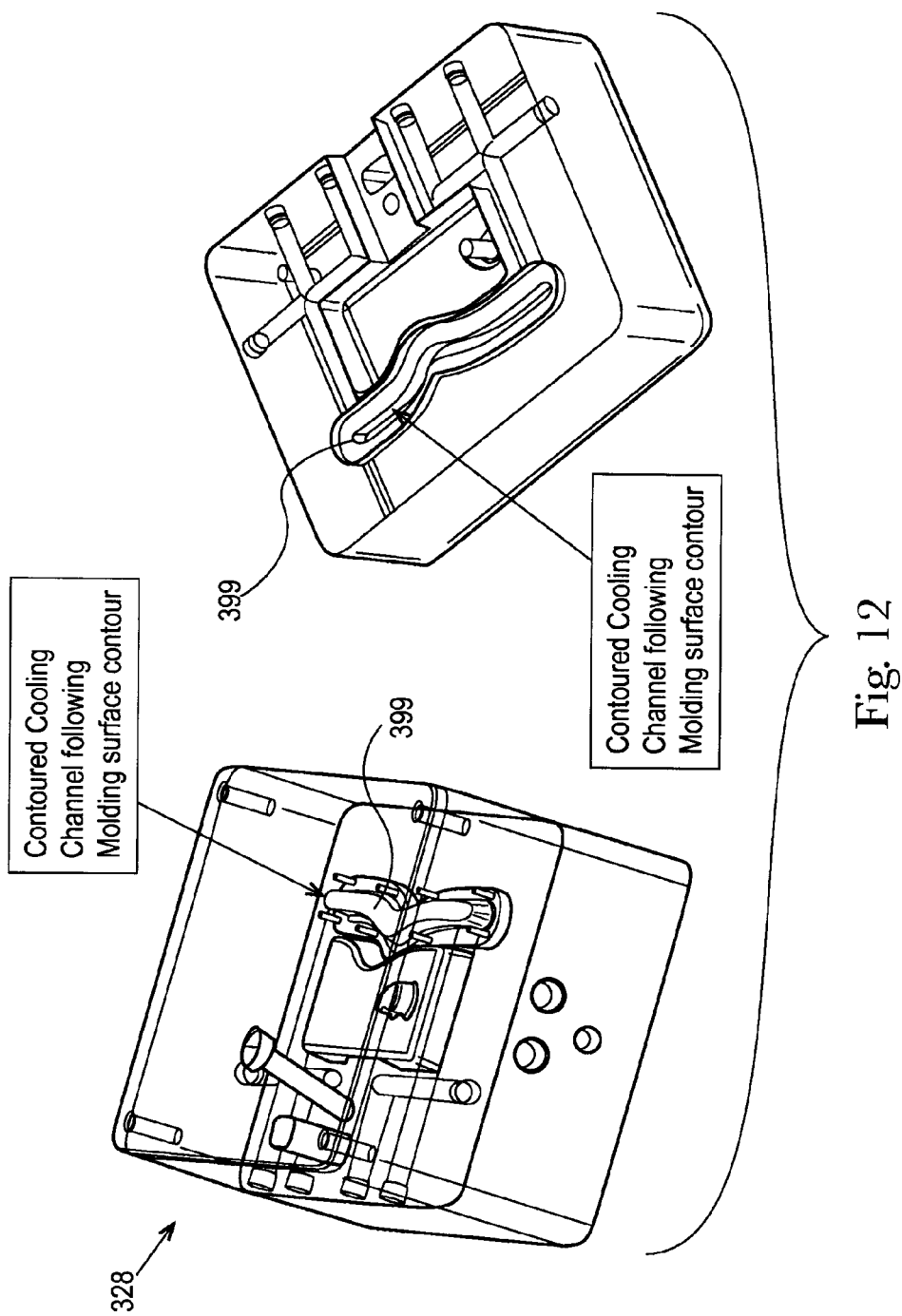
FIG. 12 illustrates a perspective view of a mold assembly having at least one cooling line that includes non-linear, non-coaxial, or non-planar cooling channel.

Turning now to FIG. 12, a cooling complexity level seven mold assembly 328 is illustrated. The cooling complexity level seven mold assembly 328 is a cooling complexity level two through six mold assembly that includes at least one conformal cooling cavity 399. The conformal cooling cavity 399 at least partially complements the contours of the mold cavity to provide maximum active cooling. The conformal cooling cavity 399 is non-linear, non-coaxial, and/or non-planar. Conformal cooling cavities 399 require complex machinery to form. Additionally, conformal cooling cavities 399 take significant amounts of time to form. As a result, cooling complexity level seven mold assemblies are very expensive and are generally reserved for high output consumer product injection molding machines that have very intricate part geometries.

Figure 13:
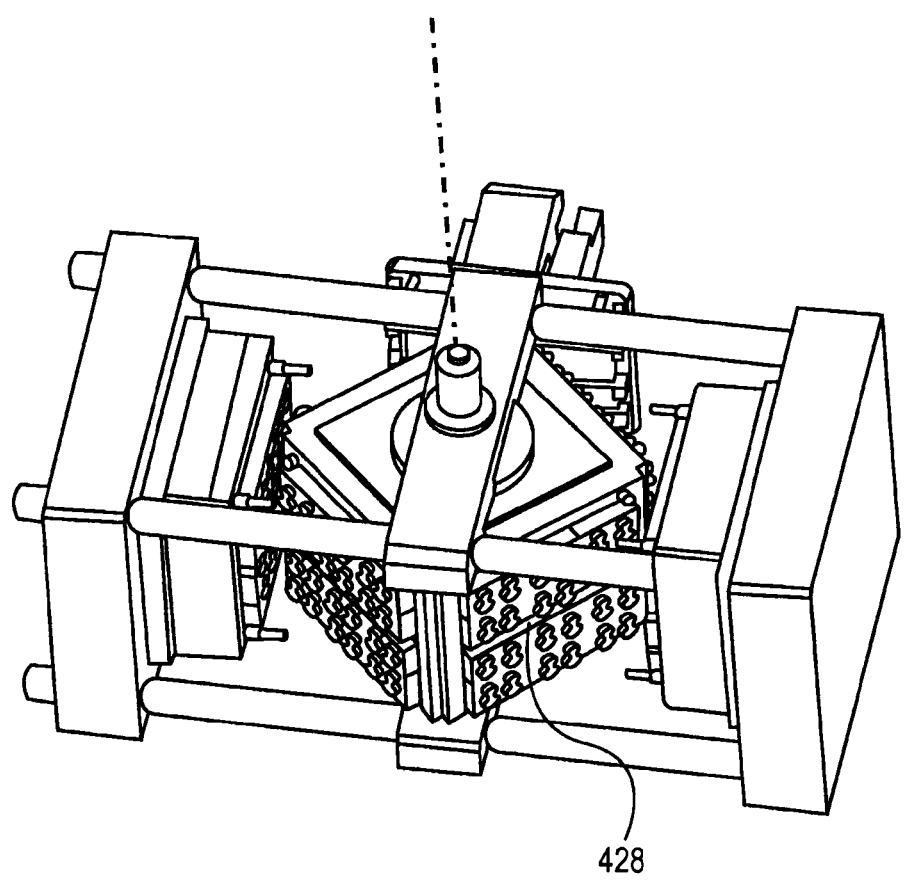
FIG. 13 illustrates one embodiment of a cube mold that incorporates a mold having a simplified cooling system.

The simplified cooling systems described herein may be incorporated into virtually any type of conventional injection mold, such as an injection molding machine having a cube mold assembly 428, as illustrated in FIG. 13.

Generally speaking, the low constant pressure injection molding machines of the present disclosure include molds and/or mold assemblies manufactured from materials having high thermal conductivity, as discussed above. This high thermal conductivity allows the disclosed low constant pressure injection molding machines, molds, and mold assemblies to cool molded parts using cooling complexity level three mold assemblies or lower for virtually any part geometry. Preferably a cooling complexity level two mold assembly will be used to cool a molded part. More preferably a cooling complexity level one mold assembly will be used to cool a molded part. For some part geometries, a cooling complexity level zero mold assembly may even be used. The cooling complexity level three or lower mold assemblies may be used even in ultra high output consumer product injection molding machines (e.g., class 101-102 injection molding machines) where more complex cooling systems were needed for conventional injection molds made from high hardness, low thermal conductivity materials. As a result, the disclosed low constant pressure injection molds and mold assemblies, and thus the injection molding machines, are less costly to manufacture, while decreasing mold cycle times and increasing mold productivity due at least in part to the availability of less complex cooling systems.

An additional benefit of molds made from high thermal conductivity materials is that a temperature profile for the mold is more uniform during the injection molding process than in conventional molds. In other words, there is less temperature variation from point to point within the mold. As a result, parts manufactured in molds with high thermal conductivity have less internal stress (and a more uniform crystalline structure) than parts manufactured in conventional molds. This lower internal stress and more uniform crystallinity result in lower rates of part warp. In conventional molds, the mold cavity is often designed to offset part warp due to non-uniform temperature gradients, which adds to the cost and complexity of conventional mold assemblies. Finalizing a particular offset usually requires an iterative and time consuming trial process. In high thermal conductivity molds, the mold cavity need not be designed to offset warp because the molded part does not experience a significant amount of warp, as internal stresses are more uniform due to the more uniform cooling. Thus, the iterative offset process used in the design of conventional molds may be avoided, further reducing manufacturing costs and time.

Test Data

Computer analyses of several different mold configurations were conducted to show the differences in temperature and heat flux between a standard cooling system in a conventional high hardness, low thermal conductivity mold and a simplified cooling system in a high thermal conductivity mold. The computer program used was SigmaSoft version 4.8 made by Magma Corporations. The high hardness, low thermal conductivity material used to model the conventional cooling system and the idealized cooling system for each test was P20 steel. The high thermal conductivity materials used to model the simplified cooling system were QC10 Aluminum, copper, and Mold Max®.

EXAMPLE #1

In a test of a first example mold, a computer model of a rectangular mold was used. The rectangular mold was modeled under five different conditions. First, an "ideal" condition was modeled. The ideal condition included a completely conformal cooling channel located 5 mm from the molding surfaces. The ideal condition is considered to be better than any practical cooling system in existence today and may be considered to produce a theoretical maximum amount of cooling for the given mold cavity.

In a second condition, the ideal cooling channel was moved in the computer model to 7.5 mm from the mold surfaces while still remaining completely conformal. One skilled in the art will realize that completely conformal cooling channels are practically impossible for any shape (even very simple shapes) because if the completely conformal cooling channel were continuous in all respects the mold surfaces would be completely separated from the rest of the mold by the cooling channel.

In a third condition, the ideal cooling channel was moved in the computer model to 10 mm from the mold surfaces while still remaining completely conformal. The third condition may be considered to approximate the best practical cooling configuration because practical cooling channels could be machined closer than 10 mm, but would not be completely conformal.

In a fourth condition, the ideal cooling channel was moved in the computer model to 12.7 mm from the mold surfaces while still remaining completely conformal.

In a fifth condition, a conventional cooling channel was located in the computer model at a distance of 5 mm from the molding surfaces. The conventional cooling channel approximates the practical best case cooling system for a conventional mold. 5 mm is generally accepted to be a close as is practically possible for a cooling channel to be to a mold cavity surface. Closer than 5 mm would run the risk of mold deformation in the area of the cooling channel during plastic injection.

Finally, a simplified cooling system, such as one of the cooling complexity level zero to three mold assemblies described above, was modeled at 5 mm, 10 mm, and 15 mm distances in a high thermal conductivity material, such as the materials that would be used to manufacture the molds and mold assemblies in the low constant pressure injection molding machines described herein.

The results of the test are summarized in Table 1 below in which the x-axis represents distance from the mold surface and the y-axis represents heat flux.

TABLE 1

| Heat Flux | | | | | |
|---|---|---|---|---|---|
| Rectangle | 5 mm | 7.5 mm | 10 mm | 12.7 mm | 15 mm |
| Ideal | 28.13 BTU/mm2 | 22.64 BTU/mm2 | 18.81 BTU/mm2 | 15.91 BTU/mm2 | |
| Conventional | 19.05 BTU/mm2 | | | | |
| Simplified | 28.98 BTU/mm2 | | 27.52 BTU/mm2 | | 26.12 BTU/mm2 |

Figure 14:
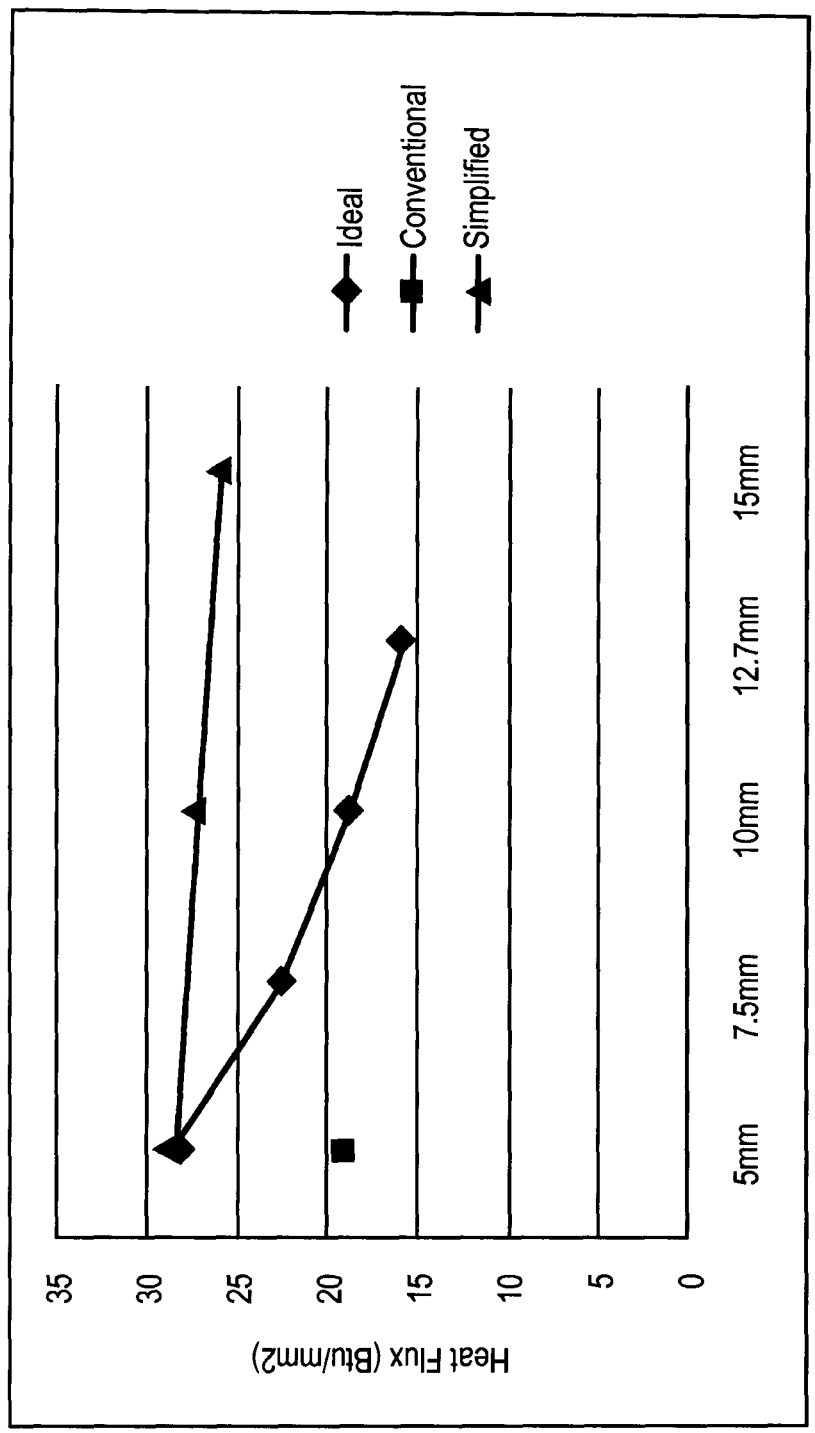
FIG. 14 is a chart of heat flux data from Table 1.

The data summarized in Table 1 is illustrated in chart form in FIG. 14.

As is expected, heat flux drops as the cooling channel is moved farther from the mold surface. However, as illustrated in the chart of FIG. 14, the simplified cooling system exceeds the heat flux of even the ideal cooling system in a conventional mold at 5 mm. In other words, the simplified cooling system provides better cooling than even the theoretical best cooling in a conventional mold. Moreover, heat flux through the mold with the simplified cooling system did not drop off as fast with increasing distance from the mold surface. This feature of the simplified cooling system allows cooling channels to be located farther from the mold cavity surfaces than in conventional molds, which results in more uniform temperatures within the mold and fewer hot spots. The more uniform temperature distribution within the mold leads to more consistent molded parts.

Figure 15:
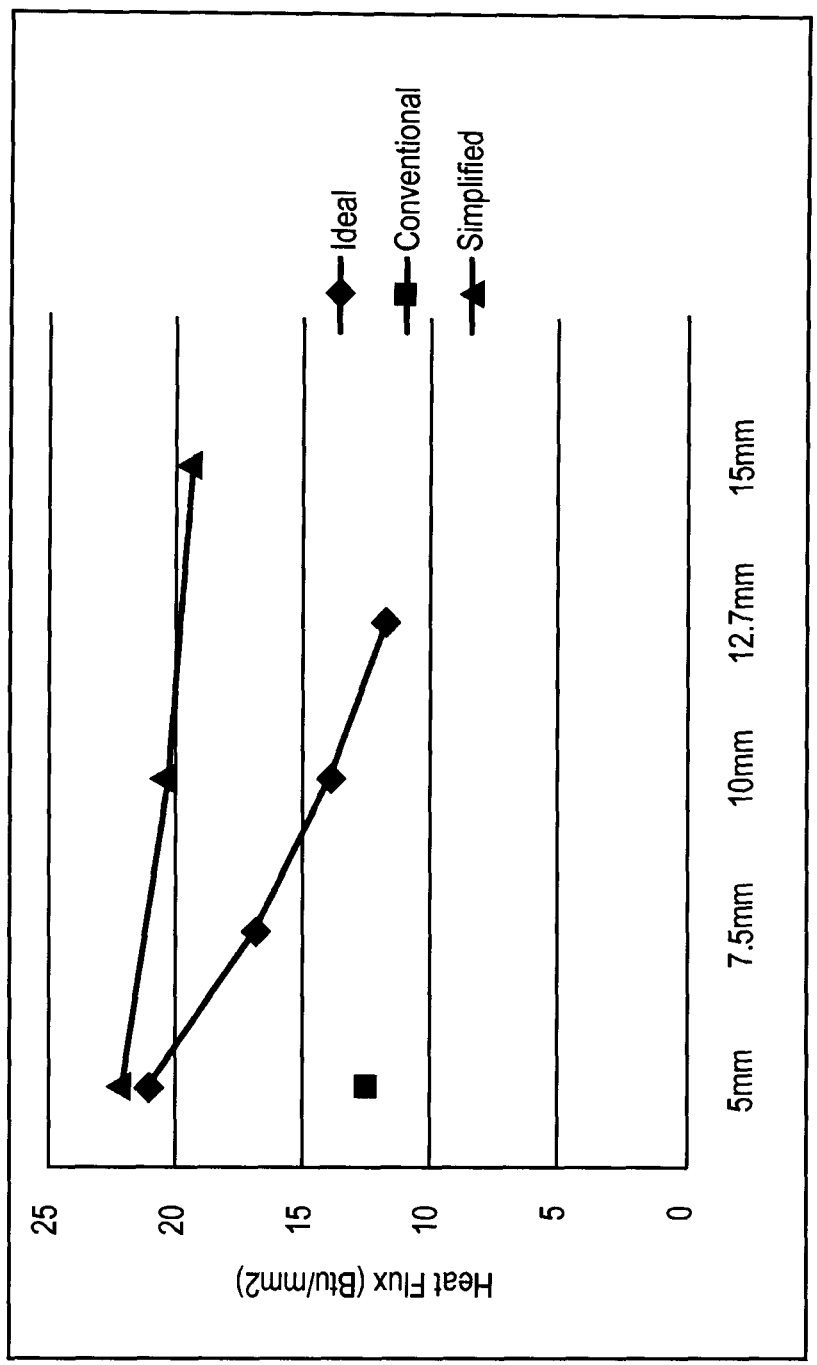
FIG. 15 is a chart of heat flux data from Table 2.
Figure 16:
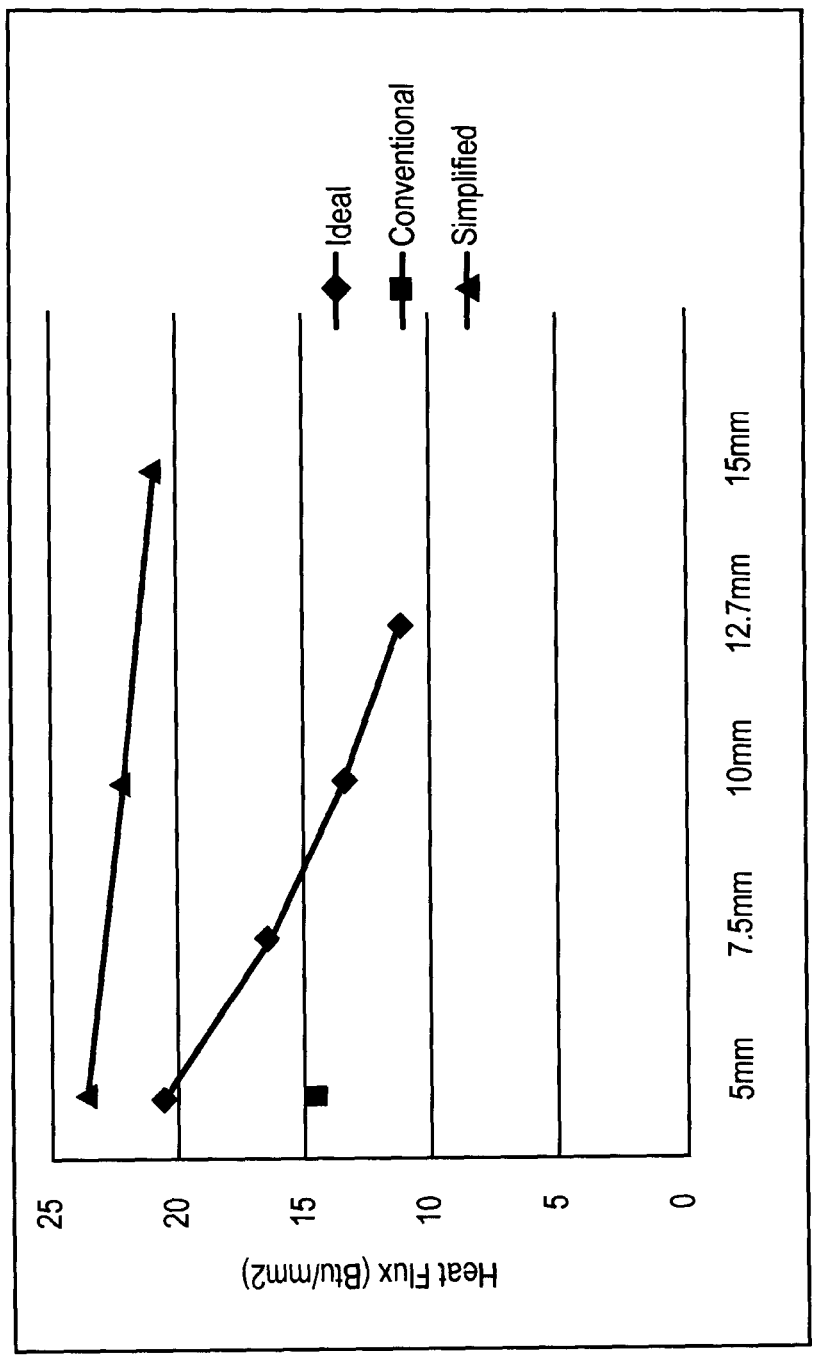
FIG. 16 is a chart of heat flux data from Table 3.
Figure 17:
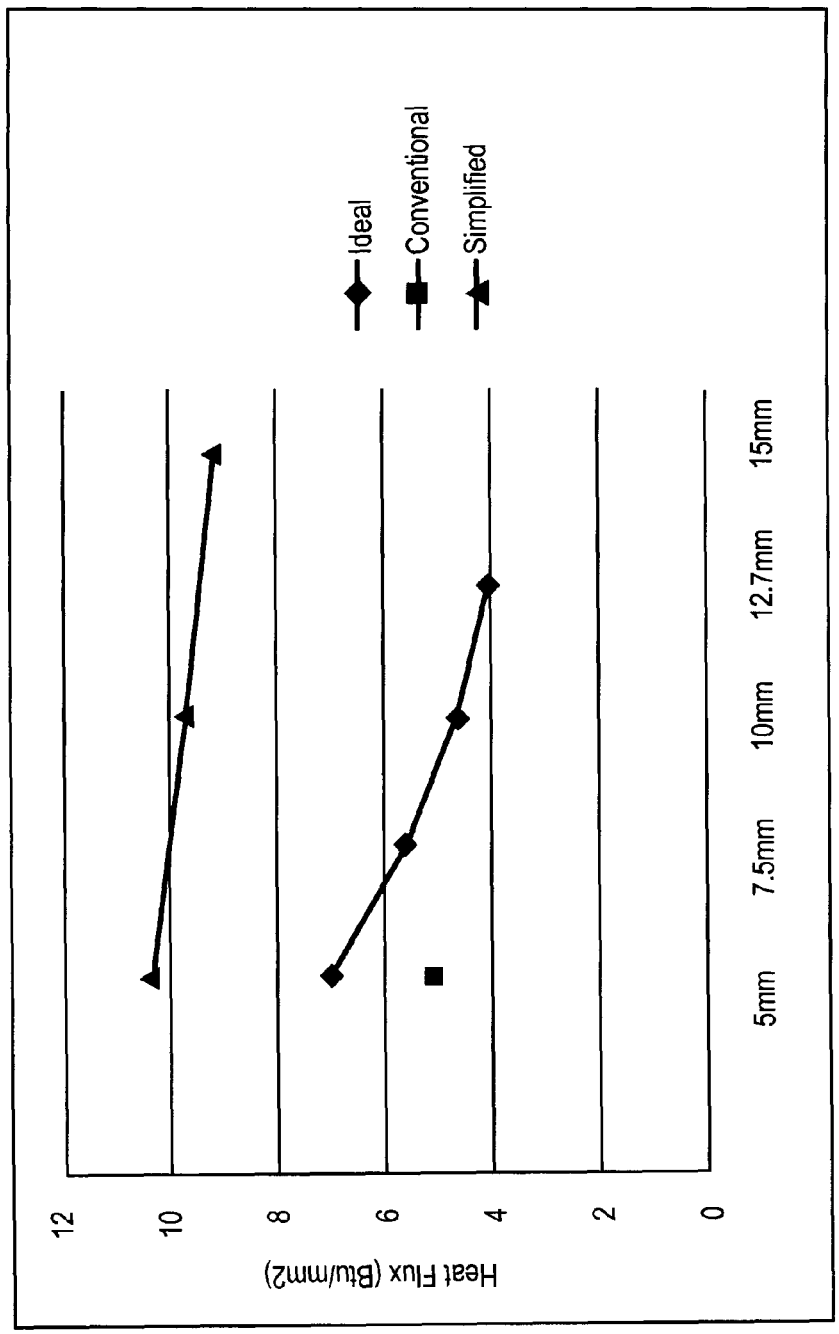
FIG. 17 is a chart of heat flux data from Table 4.

Similar tests were carried out for various part geometries including a circle, a square, a rectangle, and an oblong deodorant cap. The test results are illustrated below in Tables 2-4 and the charts of FIGS. 15, 16, and 17.

TABLE 2

| Heat Flux | | | | | |
|---|---|---|---|---|---|
| Circle | 5 mm | 7.5 mm | 10 mm | 12.7 mm | 15 mm |
| Ideal | 21.03 BTU/mm2 | 16.71 BTU/mm2 | 13.85 BTU/mm2 | 11.66 BTU/mm2 | |
| Conventional | 12.55 BTU/mm2 | | | | |
| Simplified | 22.2 BTU/mm2 | | 20.63 BTU/mm2 | | 19.41 BTU/mm2 |

TABLE 3

| Heat Flux | | | | | |
|---|---|---|---|---|---|
| Square | 5 mm | 7.5 mm | 10 mm | 12.7 mm | 15 mm |
| Ideal | 20.56 BTU/mm2 | 16.5 BTU/mm2 | 13.68 BTU/mm2 | 11.5 BTU/mm2 | |
| Conventional | 14.55 BTU/mm2 | | | | |
| Simplified | 23.63 BTU/mm2 | | 22.3 BTU/mm2 | | 21.08 BTU/mm2 |

TABLE 4

| Heat Flux | | | | | |
|---|---|---|---|---|---|
| Deodorant Cap | 5 mm | 7.5 mm | 10 mm | 12.7 mm | 15 mm |
| Ideal | 7.04 BTU/mm2 | 5.63 BTU/mm2 | 4.65 BTU/mm2 | 4.07 BTU/mm2 | |
| Conventional | 5.1 BTU/mm2 | | | | |
| Simplified | 10.4 BTU/mm2 | | 9.78 BTU/mm2 | | 9.21 BTU/mm2 |

While the rectangle, square and circle shapes shown above are relatively simple shapes, these shapes do not have any real practical use. The deodorant cap data is data from an existing injection molded part, namely a cap for a deodorant container. The deodorant cap tests modeled a mold assembly for manufacturing a Secret® deodorant cap made by The Procter & Gamble Company as of 2007. The deodorant cap represents an example of a relatively simple molded part geometry. The deodorant cap, while remaining a relatively simple shape, is more complex than the rectangle, square, or circle examples above. When comparing the data, it is evident that the simplified cooling system described herein becomes more effective as compared to conventional cooling systems as part geometry becomes more complex. For example, the simplified cooling system is approximately twice as effective, with respect to heat flux, as the practical best conventional cooling for the deodorant cap at the same distance from the mold cavity surface. Moreover, at 15 mm the simplified cooing system is approximately 80% better than the conventional cooling system at 5 mm Similarly, at 5 mm, the simplified cooling system has approximately 47% higher heat flux than an idealized cooling system at 5 mm In other words, heat flux through first and second mold sides in a simplified cooling mold is greater than heat flux through first and second mold sides of an idealized cooling mold when the simplified cooling lines and the idealized cooling lines are formed at the same distance from the mold cavity. As a result, the simplified cooling system may be more easily manufactured while providing more efficient cooling than a conventional cooling system.

The more efficient cooling provided by the simplified cooling systems described herein also results in a more uniform temperature distribution within the mold cavity. Using the same computer program described above (i.e., Sigma Soft v. 4.8), a test was run on the deodorant cap to determine the temperature distribution within the mold cavity. The components included in the analysis included a moving mold side and a fixed mold side. Multiple transient thermal cycles were considered to capture a steady state mold temperature profile. In each cycle, the program accounted for mold closing time, a cooling phase, and a mold opening time to yield an accurate representation of the transient thermal conditions during a normal molding cycle. Upon mold closing, the mold cavity was assumed to be filled with a polymer melt at a uniform melt temperature of 218° C. The cooling lines were maintained at a constant and uniform temperature of 20° C. The mold sides were given an initial temperature of 30° C. at the start of the first cycle. The analysis was completed for a total of 16 cycles to ensure that the results reached a quasi-steady state. The thermal heat transfer coefficients between various mold components are listed below.

| Component 1 | Component 2 | Heat transfer coefficent W/m² K |
|---|---|---|
| Mold fixed part | Mold moving part | 10,000 |
| Mold fixed and moving parts | Polymer melt | 800 |
| Mold fixed and moving parts | Cooling fluid | 10,000 |

The material properties used to describe the thermal properties of each component include density, heat capacity at constant pressure (cp) and thermal conductivity. The thermal properties for each component material are summarized below.

| Component | Density (g/cm^3) | Heat Capacity J/kgK | Thermal Conductivity W/mK |
|---|---|---|---|
| P20 Steel | 7.72 | 496 | 26 |
| QC10 Aluminum | 2.83 | 913.9 | 160 |
| Pure Copper | 8.9 | 396 | 390 |
| Mold Max ® XL | 8.86 | 393.9 | 68.9 |
| 35 MFI PP FPT350WV3 | 0.748 | 2039 | 0.16 |

The results of the analysis were evaluated at the end of the $16^{th}$ cycle. The minimum and maximum temperatures on the cavity surface of both the moving side and the fixed side of the mold assembly were recorded. The maximum temperature gradient on either the moving side or the fixed side was defined as the maximum temperature minus the minimum temperature, which provides a metric of thermal uniformity for each mold part. The thermal gradient across the mold wall, which is defined as the maximum temperature anywhere on the fixed side minus the minimum temperature anywhere on the moving side and the maximum temperature anywhere on the moving side minus the minimum temperature anywhere on the fixed side, provides an additional measure of thermal uniformity.

The results of the simulation are summarized below in Table 5.

TABLE 5

| | Idealized 5 mm | Idealized 10 mm | Idealized 15 mm | Conventional 5 mm | Conventional 10 mm | Conventional 15 mm |
|---|---|---|---|---|---|---|
| Fixed Side | | | | | | |
| Max Temp ° C. | 28.7 | 33.3 | 37.4 | 35.4 | 38.9 | 41.7 |
| Min Temp ° C. | 24.2 | 26.5 | 28.8 | 27.7 | 30.7 | 36.2 |
| Max Delta ° C. | 4.5 | 6.8 | 8.6 | 7.7 | 8.2 | 5.5 |
| Moving Side: | | | | | | |
| Max Temp ° C. | 48.34 | 67 | 85.4 | 58.1 | 58.5 | 58.6 |
| Min Temp ° C. | 26.8 | 32.4 | 37.9 | 31 | 30 | 31.7 |
| Max Delta ° C. | 21.54 | 34.6 | 47.5 | 27.1 | 28.5 | 26.9 |
| Gradient across wall ° C. | 24.14 | 40.5 | 56.6 | 30.4 | 27.8 | 22.4 |

| | Simplified 5 mm QC 10 | Simplified 5 mm Cu | Simplified 5 mm Mold Max | Simplified 10 mm QC 10 | Simplified 10 mm Cu | Simplified 10 mm Mold Max |
|---|---|---|---|---|---|---|
| Fixed Side | | | | | | |
| Max Temp ° C. | 23.7 | 22.5 | 27.4 | 24.1 | 22.9 | 29.5 |
| Min Temp ° C. | 22.1 | 21.5 | 24.1 | 22.3 | 21.7 | 25.3 |
| Max Delta ° C. | 1.6 | 1 | 3.3 | 1.8 | 1.2 | 4.2 |
| Moving Side: | | | | | | |
| Max Temp ° C. | 37.6 | 30.1 | 53.3 | 38.4 | 31.7 | 57.9 |
| Min Temp ° C. | 26.1 | 24.1 | 28.5 | 26.9 | 24.4 | 29.6 |
| Max Delta ° C. | 11.5 | 6 | 24.8 | 11.5 | 7.3 | 28.3 |
| Gradient across wall ° C. | 15.5 | 8.6 | 29.2 | 16.1 | 10 | 32.6 |

TABLE 5-continued

|  | Simplified 15 mm QC 10 | Simplified 15 mm Cu | Simplified 15 mm Mold Max |
|---|---|---|---|
| Fixed Side | | | |
| Max Temp ° C. | 24.8 | 22.7 | 29.9 |
| Min Temp ° C. | 22.9 | 21.6 | 26 |
| Max Delta ° C. | 1.9 | 1.1 | 3.9 |
| Moving Side: | | | |
| Max Temp ° C. | 41.6 | 34.3 | 60.9 |
| Min Temp ° C. | 27.3 | 24.3 | 30.5 |
| Max Delta ° C. | 14.3 | 10 | 30.4 |
| Gradient across wall ° C. | 18.7 | 12.7 | 34.9 |

As illustrated above, a simulated conventional cooling system machined to within 5 mm of the mold cavity resulted in a temperature delta of 7.7° C. in a fixed side of the mold and a temperature delta of 30.4° C. in a moving side of the mold. Similarly, an idealized conventional cooling system (as defined above) machined to within 5 mm of the mold cavity resulted in a temperature delta of 4.5° C. in the fixed side and 24.14° C. in the moving side.

Conversely, a simulated simplified cooling system, as described herein, machined to within 5 mm of the mold cavity resulted in a temperature delta of only 1.6° C. in the fixed side and only 15.5° C. in the moving side. When machined at 10 mm from the mold cavity, the simplified cooling system resulted in a 1.8° C. delta in the fixed side and a 16.1° C. delta in the moving side. Finally, when machined at 15 mm from the mold cavity, the simplified cooling system resulted in a 1.9° C. delta in the fixed side and a 18.7° C. delta in the moving side.

It was found that the simplified cooling system machined at 5 mm, 10 mm, or 15 mm from the mold cavity surface exhibited a temperature delta that was 7% less to 78% less in the fixed side and between 75% less to approximately 41% less (in the case of QC10) temperature delta in the moving side when compared to respective mold sides in an idealized cooling system machined at 5 mm from the mold cavity surface.

To summarize, the simplified cooing systems described herein milled at 5 mm from the mold cavity reduced temperature delta in the mold cavity by as much as 78% as compared to the idealized conventional cooling at 5 mm (thus, a ratio of temperature gradients for simplified cooling to idealized conventional cooling is less than one) and by as much as 87% as compared to the conventional cooling at 5 mm in the fixed side of the mold. In the moving side of the mold, the simplified cooling system at 5 mm reduced temperature delta by as much as 75% as compared to the idealized conventional cooling at 5 mm (again, a ratio of temperature gradients for simplified cooling to idealized conventional cooling is less than one) and by as much as 78% as compared to the conventional cooling at 5 mm. Even when milled at a greater distance (e.g., 15 mm) from the mold cavity, the simplified cooling system reduced temperature delta by as much as 85% as compared to the conventional cooling at 5 mm in the fixed side and by as much as 63% as compared to the conventional cooling at 5 mm in the moving side. As a result, the simplified cooling systems described herein may be machined at greater distances from the mold cavity, which reduces manufacturing costs of the mold by making the machining of the cooling channels easier, while still providing superior cooling capability vs. conventional cooling systems. This superior cooling capability and more uniform temperature distribution increase mold productivity while simultaneously improving part quality.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low constant pressure injection molding process. While particular reference has been made herein to products for containing consumer goods or consumer goods products themselves, it should be apparent that the low constant pressure injection molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

Part, parts, or all of any of the embodiments disclosed herein can be combined with part, parts, or all of other embodiments known in the art, including those described below.

Embodiments of the present disclosure can be used with embodiments for injection molding at low constant pressure, as disclosed in U.S. patent application Ser. No. 13/476,045 filed May 21, 2012, entitled "Apparatus and Method for Injection Molding at Low Constant Pressure" (applicant's case 12127) and published as US 2012-0294963 A1, which is hereby incorporated by reference.

Embodiments of the present disclosure can be used with embodiments for pressure control, as disclosed in U.S. patent application Ser. No. 13/476,047 filed May 21, 2012, entitled "Alternative Pressure Control for a Low Constant Pressure Injection Molding Apparatus" (applicant's case 12128) and published as US 2012-0291885 A1, which is hereby incorporated by reference.

Embodiments of the present disclosure can be used with embodiments for non-naturally balanced feed systems, as disclosed in U.S. patent application Ser. No. 13/476,073 filed May 21, 2012, entitled "Non-Naturally Balanced Feed System for an Injection Molding Apparatus" (applicant's case 12130) and published as US 2012-0292823 A1, which is hereby incorporated by reference.

Embodiments of the present disclosure can be used with embodiments for injection molding at low, substantially constant pressure, as disclosed in U.S. patent application Ser. No. 13/476,197 filed May 21, 2012, entitled "Method for Injection Molding at Low, Substantially Constant Pressure" (applicant's case 12131Q) and published as US 2012-0295050 A1, which is hereby incorporated by reference.

Embodiments of the present disclosure can be used with embodiments for injection molding at low, substantially constant pressure, as disclosed in U.S. patent application Ser. No. 13/476,178 filed May 21, 2012, entitled "Method for Injection Molding at Low, Substantially Constant Pressure" (applicant's case 12132Q) and published as US 2012-0295049 A1, which is hereby incorporated by reference.

Embodiments of the present disclosure can be used with embodiments for co-injection processes, as disclosed in US patent application 61/602,650 filed Feb. 24, 2012, entitled "High Thermal Conductivity Co-Injection Molding System" (applicant's case 12361P), which is hereby incorporated by reference.

Embodiments of the present disclosure can be used with embodiments for molding with simplified cooling systems, as disclosed in U.S. patent application Ser. No. 13/765,428 filed February 12, 2013, entitled "Injection Mold Having a Simplified Evaporative Cooling System or a Simplified Cooling System with Exotic Cooling Fluids" (applicant's case 12453M), which is hereby incorporated by reference.

Embodiments of the present disclosure can be used with embodiments for molding thinwall parts, as disclosed in U.S. patent application Ser. No. 13/476,584 filed May 21, 2012, entitled "Method and Apparatus for Substantially Constant Pressure Injection Molding of Thinwall Parts" (applicant's case 12487), which is hereby incorporated by reference.

Embodiments of the present disclosure can be used with embodiments for molding with a failsafe mechanism, as disclosed in U.S. patent application Ser. No. 13/672,246 filed Nov. 8, 2012, entitled "Injection Mold With Fail Safe Pressure Mechanism" (applicant's case 12657), which is hereby incorporated by reference.

Embodiments of the present disclosure can be used with embodiments for high-productivity molding, as disclosed in U.S. patent application Ser. No. 13/682,456 filed Nov. 20, 2012, entitled "Method for Operating a High Productivity Injection Molding Machine" (applicant's case 12673R), which is hereby incorporated by reference.

Embodiments of the present disclosure can be used with embodiments for molding certain thermoplastics, as disclosed in US patent application 61/728,764 filed Nov. 20, 2012, entitled "Methods of Molding Compositions of Thermoplastic Polymer and Hydrogenated Castor Oil" (applicant's case 12674P), which is hereby incorporated by reference.

Embodiments of the present disclosure can be used with embodiments for runner systems, as disclosed in US patent application 61/729,028 filed Nov. 21, 2012, entitled "Reduced Size Runner for an Injection Mold System" (applicant's case 12677P), which is hereby incorporated by reference.

Embodiments of the present disclosure can be used with embodiments for controlling molding processes, as disclosed in U.S. Pat. No. 5,728,329 issued Mar. 17, 1998, entitled "Method and Apparatus for Injecting a Molten Material into a Mold Cavity" (applicant's case 12467CC), which is hereby incorporated by reference.

Embodiments of the present disclosure can be used with embodiments for controlling molding processes, as disclosed in U.S. Pat. No. 5,716,561 issued Feb. 10, 1998, entitled "Injection Control System" (applicant's case 12467CR), which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mold assembly for a high productivity injection molding machine, the mold assembly comprising:
   a first mold side, defining at least a portion of each of a plurality of mold cavities;
   a first support plate connected to the first mold side, wherein the first support plate includes a support plate projection that extends out away from the support plate and toward the first mold; and
   one or more first cooling lines configured to remove heat from the first mold side, during an injection molding process;
   wherein all of the one or more first cooling lines for the first mold side are contained within the first support plate; and
   wherein at least one of the one or more first cooling lines is disposed within the support plate projection.

2. The mold assembly of claim 1, wherein at least one of the one or more first cooling lines has a single axis.

3. The mold assembly of claim 1, wherein:
   the one or more first cooling lines includes a plurality of cooling lines; and
   each of the first cooling lines has a single axis.

4. The mold assembly of claim 3, wherein each of the single axes is substantially parallel to a common axis.

5. The mold assembly of claim 1, wherein the first mold side is configured to fit upon the support plate projection, when the first support plate is connected to the first mold side.

6. The mold assembly of claim 1, wherein:
   the first support plate includes a plurality of support plate projections that each extend out away from the support plate and toward the first mold;

at least one of the first cooling lines is disposed within each of the support plate projections; and the first mold side is configured to fit around the support plate projections, when the first support plate is connected to the first mold side.

7. The mold assembly of claim 1, wherein:

the first support plate includes a plurality of support plate projections that each extend out away from the support plate and toward the first mold;

at least one of the first cooling lines is disposed within each of the support plate projections; and the first mold side is configured to fit within the support plate projections, when the first support plate is connected to the first mold side.

8. The mold assembly of claim 1, wherein, each of the first cooling lines that is disposed within the support plate projection is formed with the support plate projection as a unitary structure.

9. The mold assembly of claim 1, wherein, each of the first cooling lines that is disposed within the support plate projection is permanently connected to the support plate projection.

10. The mold assembly of claim 1, wherein, each of the first cooling lines that is disposed within the support plate projection is removably connected to the support plate projection.

11. The mold assembly of claim 1, wherein the first mold side is a fixed mold side.

12. The mold assembly of claim 1, wherein the first mold side is a moving mold side.

13. The mold assembly of claim 1, wherein the first mold side has an average thermal conductivity of 30 to 200 BTU/HR FT ° F.

14. The mold assembly of claim 1, wherein the first mold side has an average thermal conductivity of 40 to 100 BTU/HR FT ° F.

15. The mold assembly of claim 1, wherein the first mold side has an average thermal conductivity of 50 to 70 BTU/HR FT ° F.

16. The mold assembly of claim 1, which is a class 101 mold assembly that is designed for more than one million molding cycles.

17. The mold assembly of claim 1, wherein at least one of the mold cavities has an L/T ratio that is greater than 100.

18. The mold assembly of claim 1, wherein at least one of the mold cavities has an L/T ratio that is greater than 200.

19. The mold assembly of claim 1, wherein at least one of the mold cavities has an L/T ratio that is greater than 250.

* * * * *